(12) United States Patent
King et al.

(10) Patent No.: US 7,640,802 B2
(45) Date of Patent: Jan. 5, 2010

(54) METHOD AND SYSTEM FOR ANALYSING TACHOMETER AND VIBRATION DATA FROM AN APPARATUS HAVING ONE OR MORE ROTARY COMPONENTS

(75) Inventors: Dennis King, Derby (GB); Ken Astley, Derby (GB); Lionel Tarassenko, Oxford (GB); Paul Anuzis, Derby (GB); Paul Hayton, Bicester (GB); Stephen King, Swadlincote (GB)

(73) Assignee: Oxford Biosignals Limited, Oxfordshire (GB)

( * ) Notice: Subject to any disclaimer, the term of this patent is extended or adjusted under 35 U.S.C. 154(b) by 327 days.

(21) Appl. No.: 10/552,745

(22) PCT Filed: Apr. 8, 2004

(86) PCT No.: PCT/GB2004/001575

§ 371 (c)(1),
(2), (4) Date: Aug. 31, 2006

(87) PCT Pub. No.: WO2004/090488

PCT Pub. Date: Oct. 21, 2004

(65) Prior Publication Data

US 2007/0006636 A1     Jan. 11, 2007

(30) Foreign Application Priority Data

Apr. 11, 2003 (GB) ................... 0308467.0

(51) Int. Cl.
*G01M 19/00* (2006.01)
*G01D 21/02* (2006.01)
*G01H 17/00* (2006.01)
*G01P 3/44* (2006.01)
*G01M 15/14* (2006.01)

(52) U.S. Cl. .......... 73/489; 73/112.01; 73/509; 73/579; 73/660; 73/865.9; 702/57; 702/113; 702/121; 702/147; 702/189

(58) Field of Classification Search .......... 73/489, 73/509, 865.9, 579, 660, 112.01; 702/57, 702/113, 121, 145, 147, 189
See application file for complete search history.

(56) References Cited

U.S. PATENT DOCUMENTS

| | | | | |
|---|---|---|---|---|
| 2,219,298 | A | * | 10/1940 | Dashefaky .................. 73/650 |
| 3,939,715 | A | * | 2/1976 | Davis .......................... 73/462 |
| 4,213,114 | A | | 7/1980 | Cochard |
| 5,152,172 | A | | 10/1992 | Leon et al. |

(Continued)

*Primary Examiner*—Thomas P Noland
(74) *Attorney, Agent, or Firm*—Blank Rome, LLP

(57) ABSTRACT

A method of analysing tachometer and vibration response data from an apparatus having one or more rotary components is provided. The method comprises the steps of: providing vibration response data and corresponding tachometer data from the apparatus for a period over which a rotary component of the apparatus varies in rotational speed, the tachometer data being for that component; repeatedly performing at intervals throughout the period the sub-steps of: determining a forcing frequency of the component from the tachometer data and a corresponding vibration response frequency of the apparatus from the vibration response data, comparing the forcing and vibration response frequencies to determine the relative phase difference between the frequencies, and determining the corresponding amplitude of the vibration response from the vibration response data; and plotting the relative phase differences and vibration amplitudes on a polar diagram. The plot trajectory is characteristic of the behavior of the apparatus over the period.

9 Claims, 18 Drawing Sheets

U.S. PATENT DOCUMENTS

| | | | |
|---|---|---|---|
| 5,412,985 A * | 5/1995 | Garcia et al. | 73/460 |
| 5,471,880 A | 12/1995 | Lang et al. | |
| 6,098,022 A | 8/2000 | Sonnichsen et al. | |
| 6,456,945 B1 * | 9/2002 | Sonnichsen et al. | 702/56 |
| 6,526,829 B1 * | 3/2003 | Lysen et al. | 73/593 |
| 6,789,422 B1 * | 9/2004 | Ward, Jr. | 73/462 |

* cited by examiner

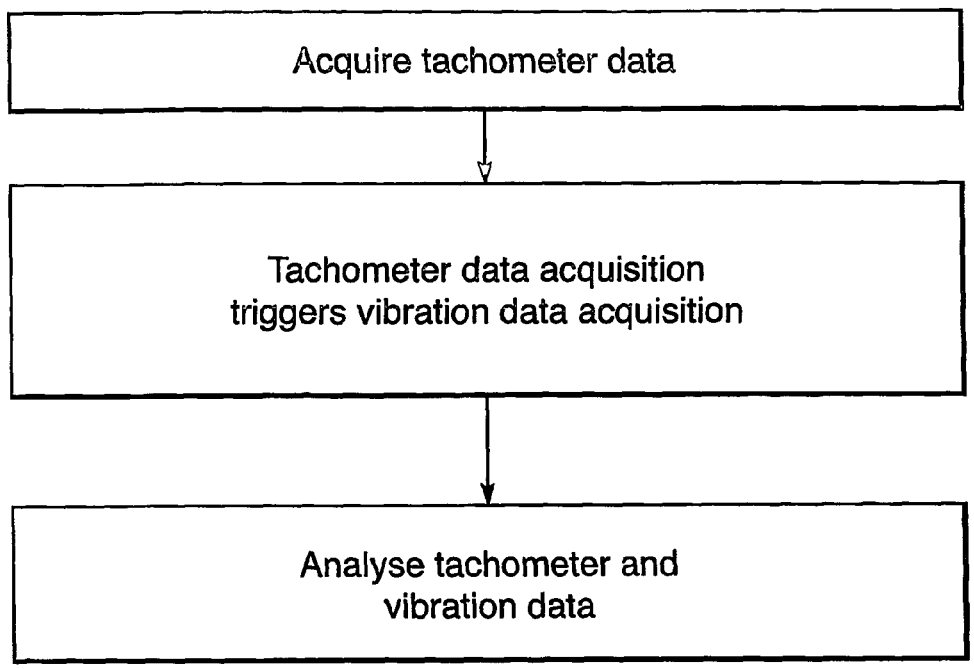
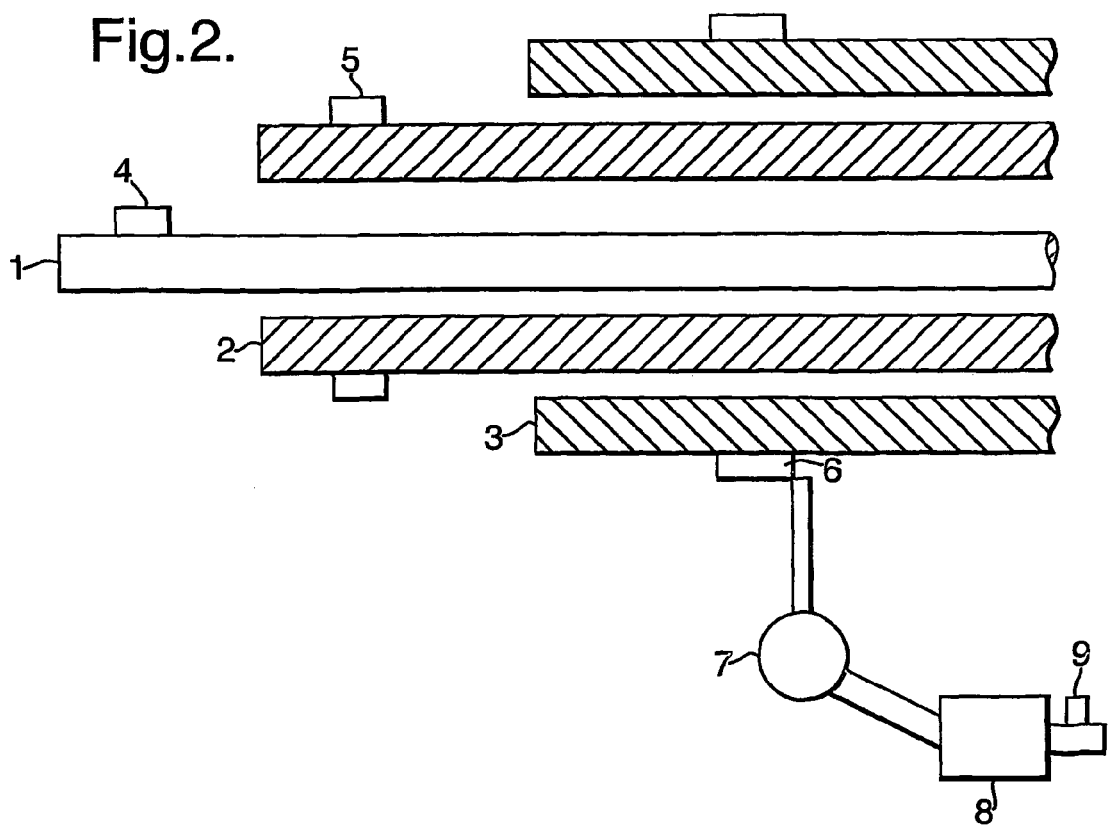

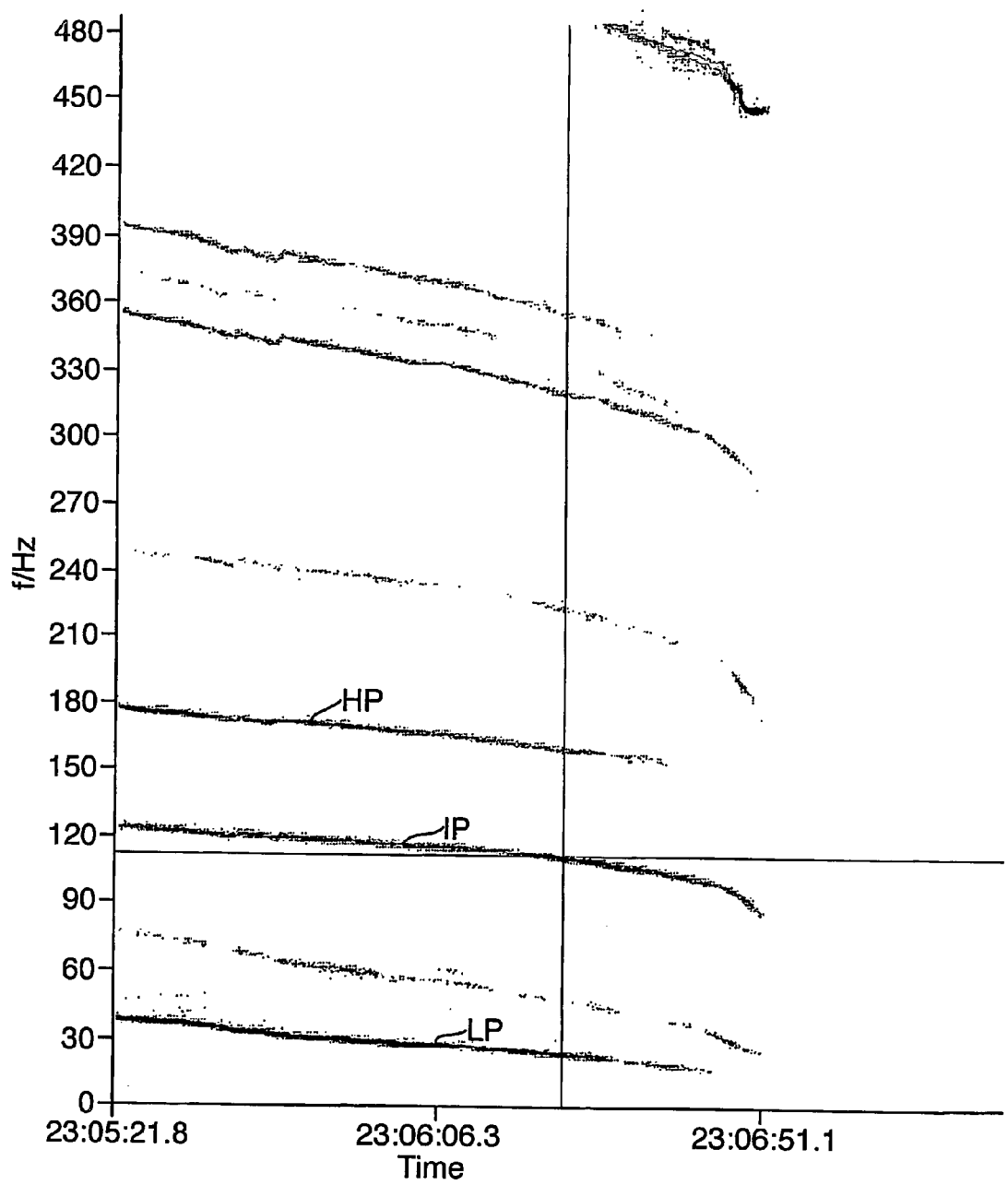

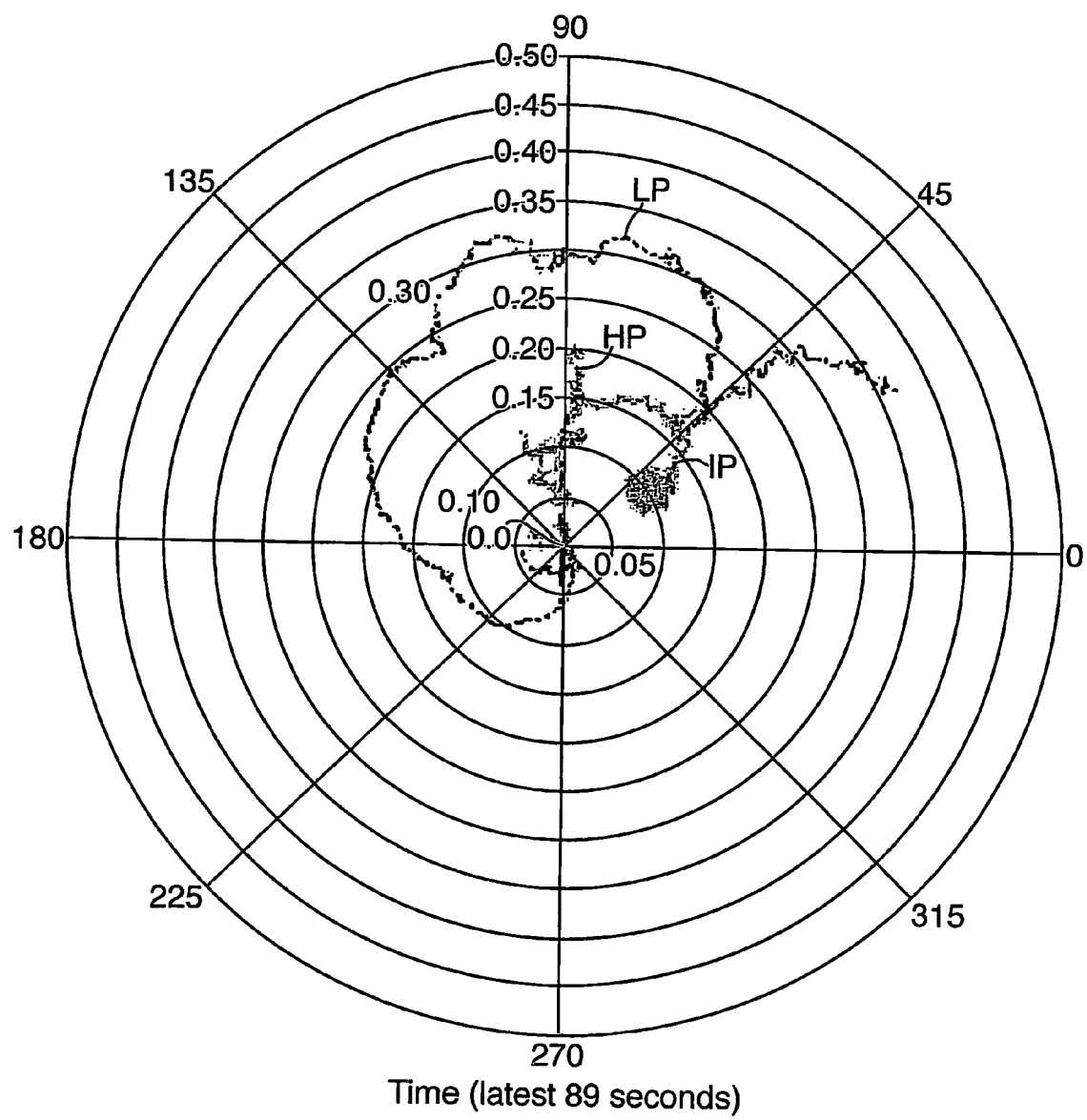

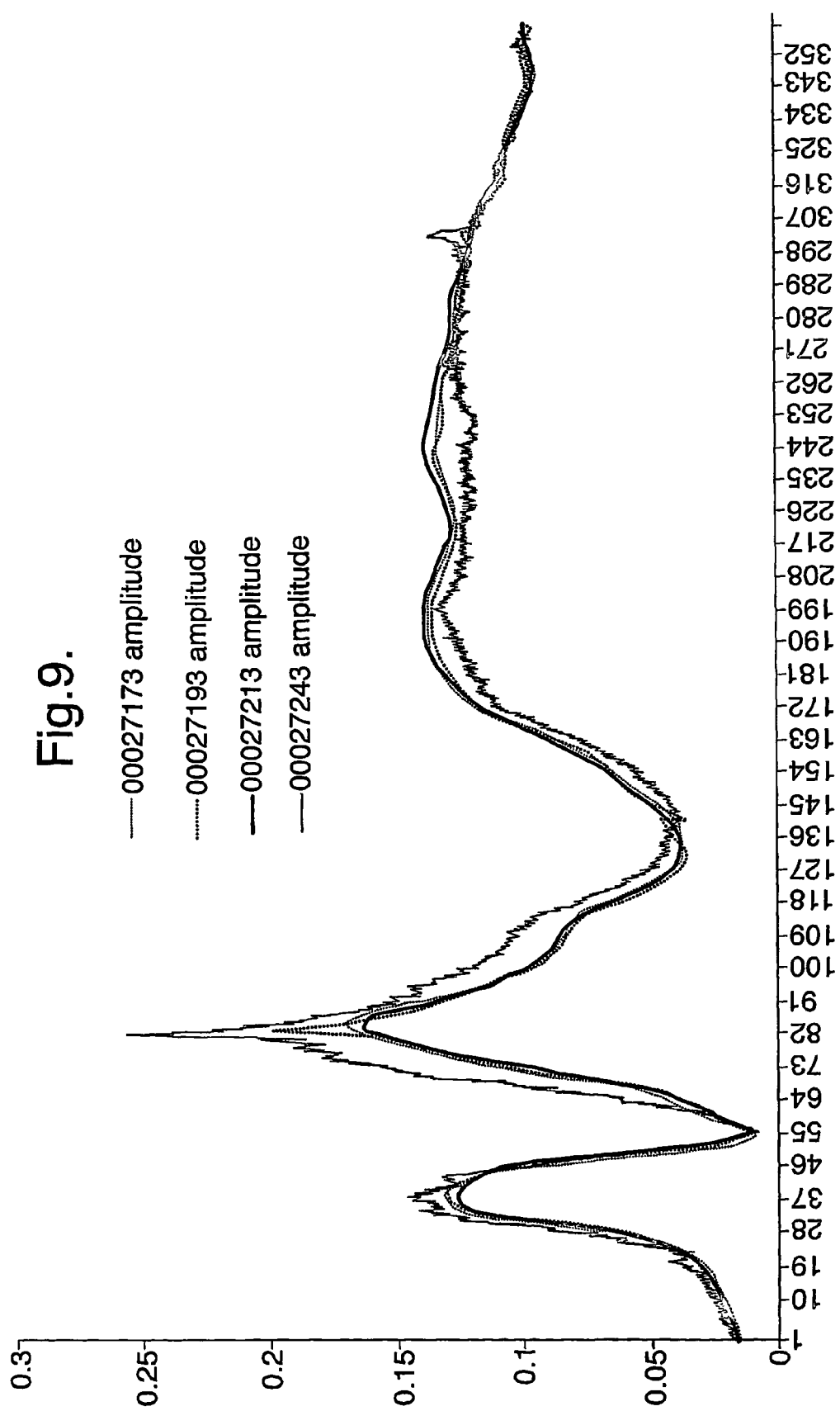

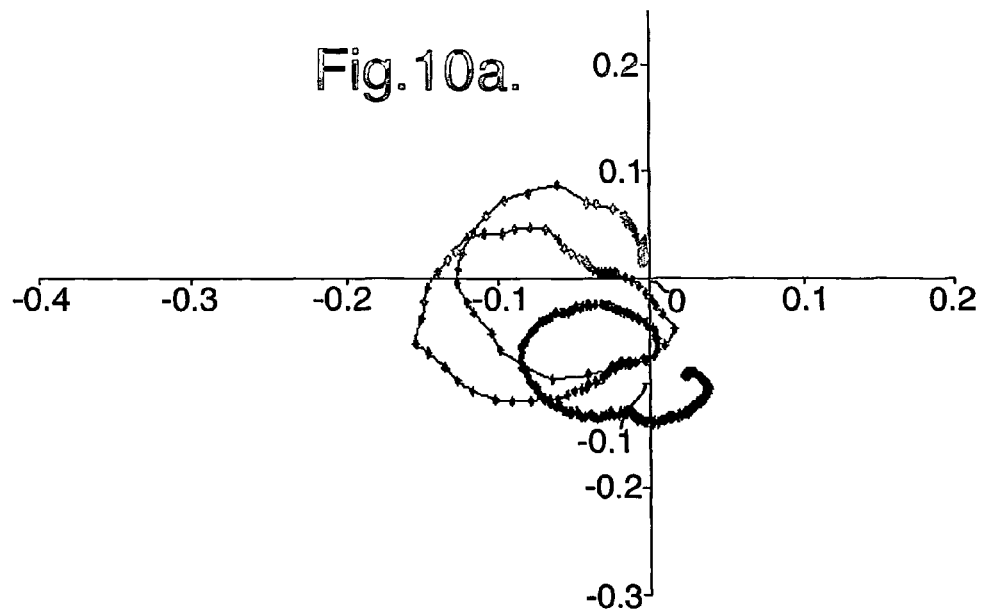
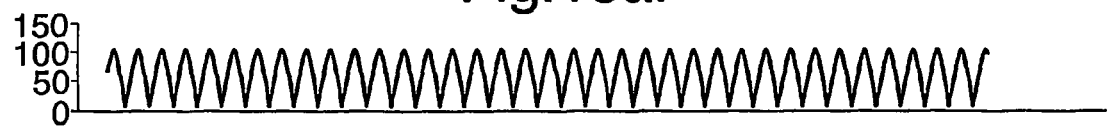
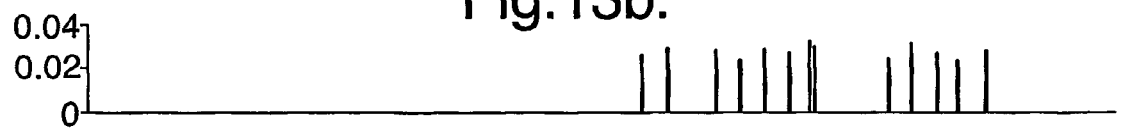

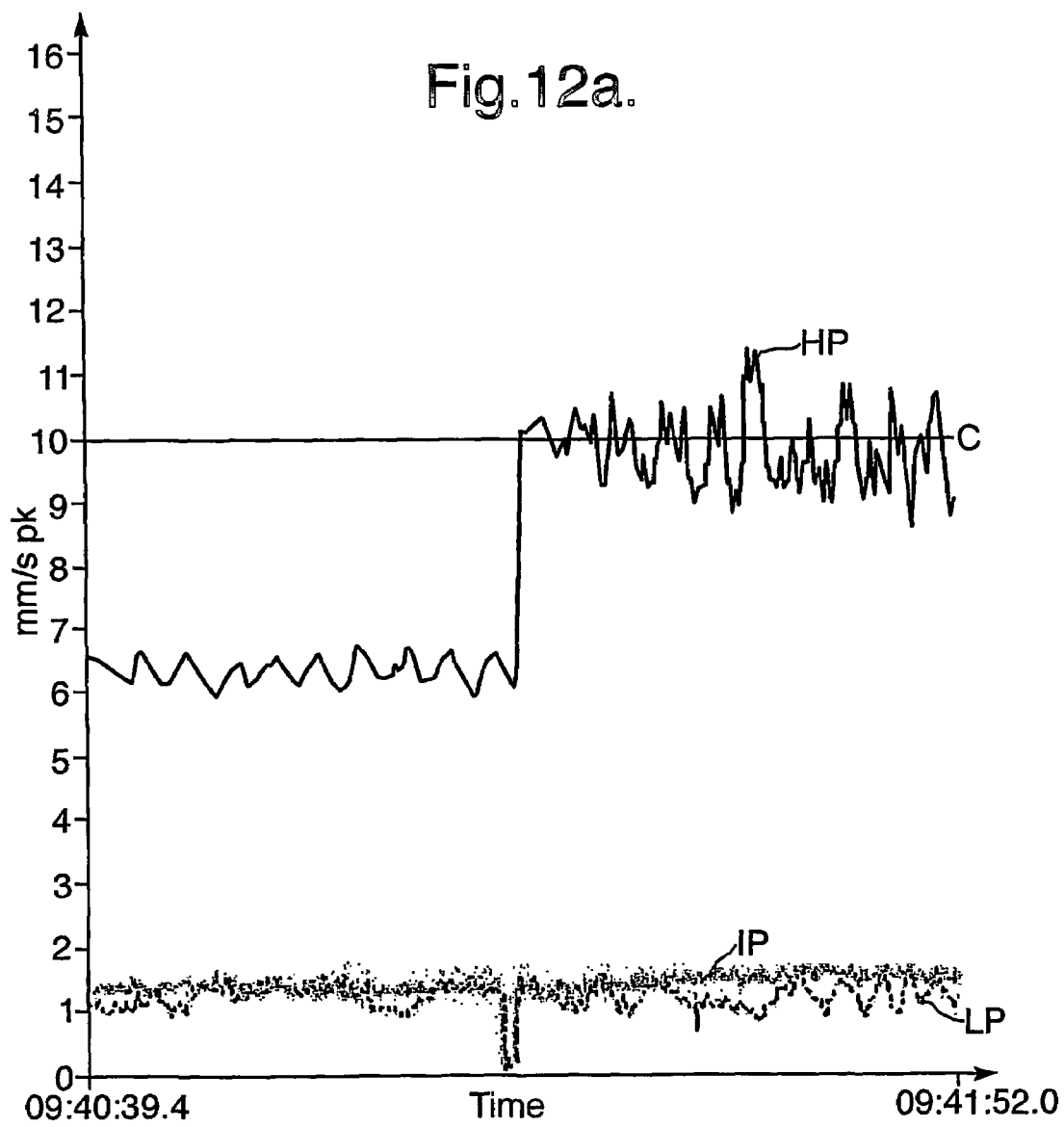

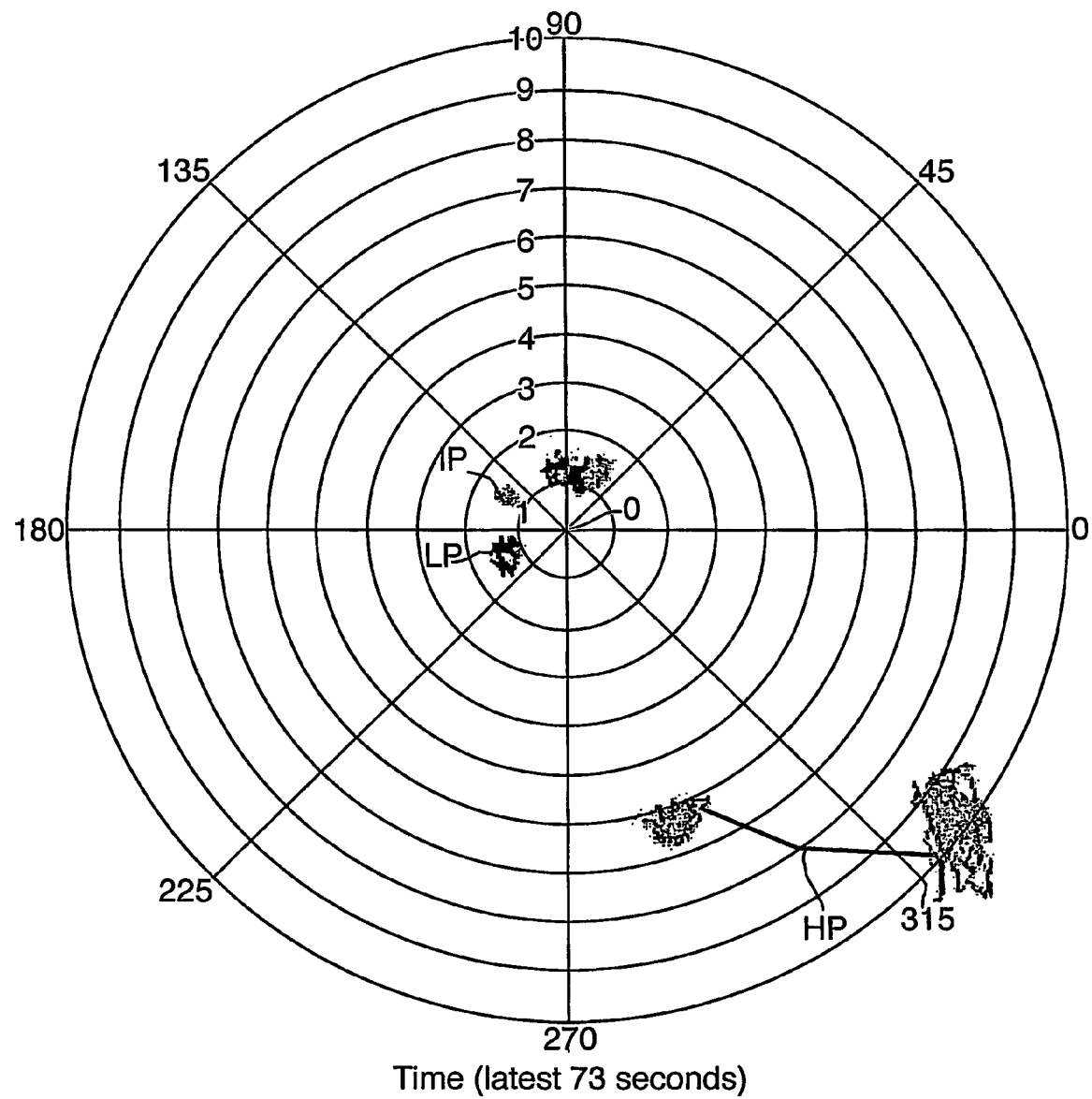

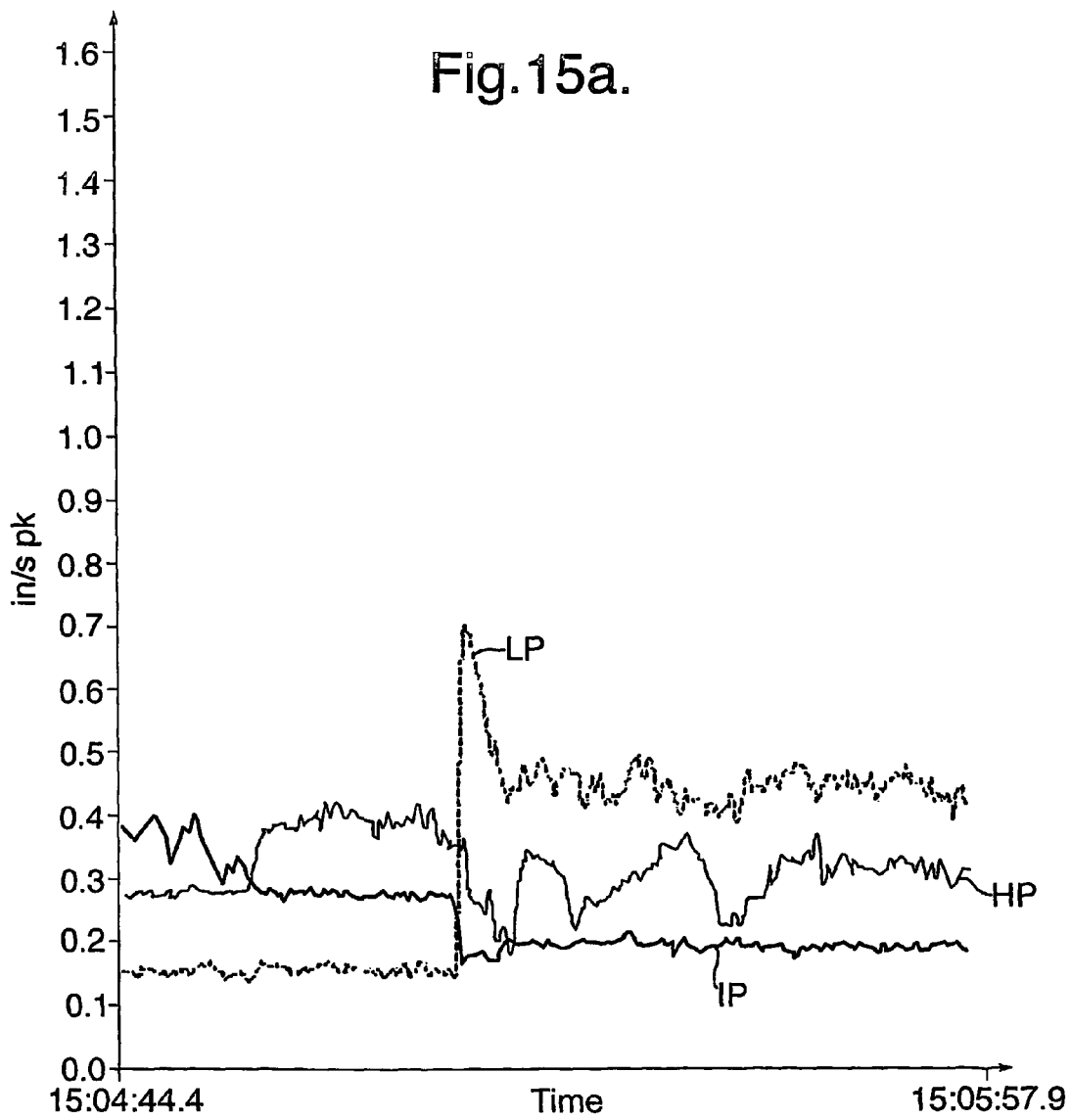

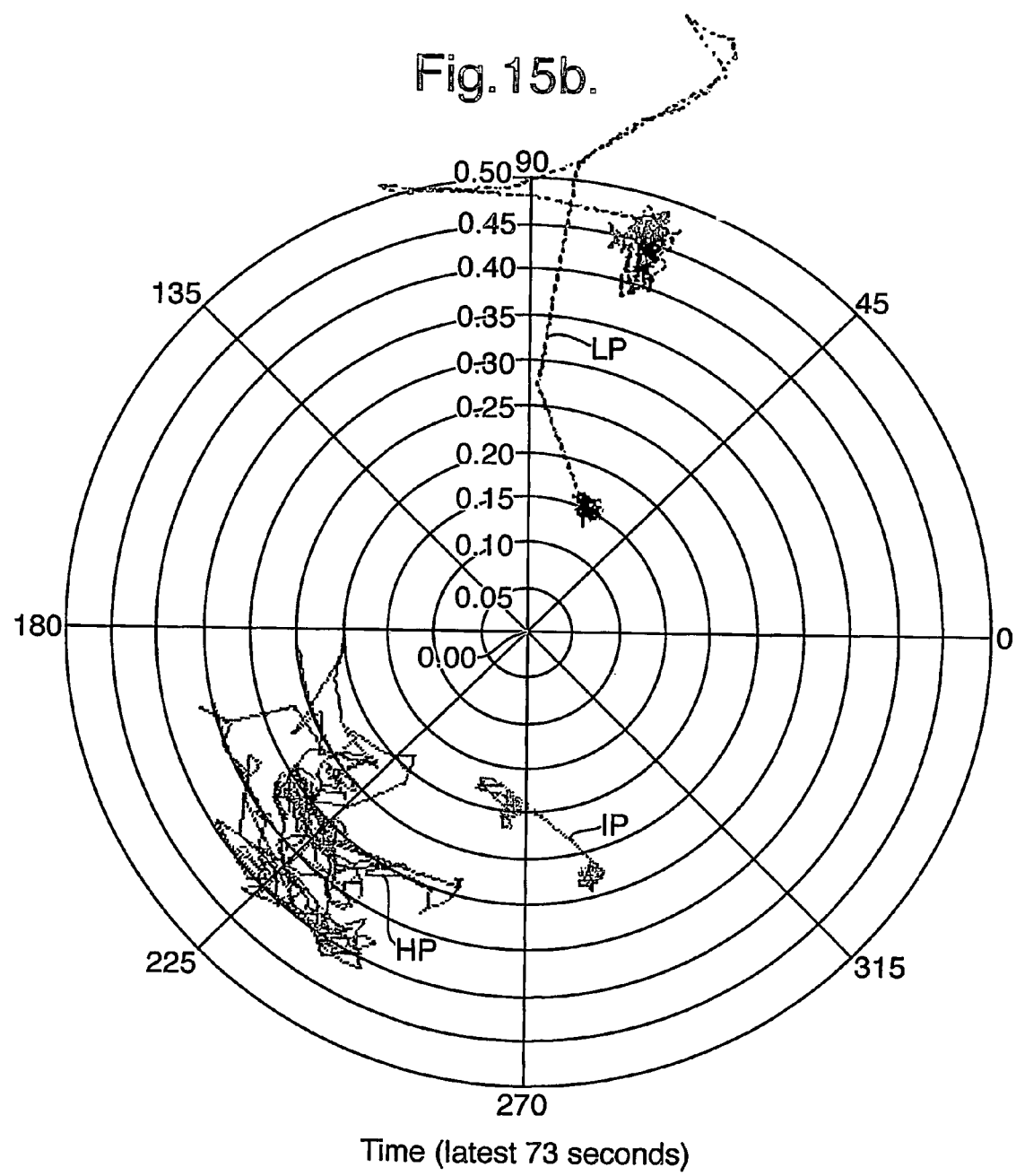
Time (latest 73 seconds)

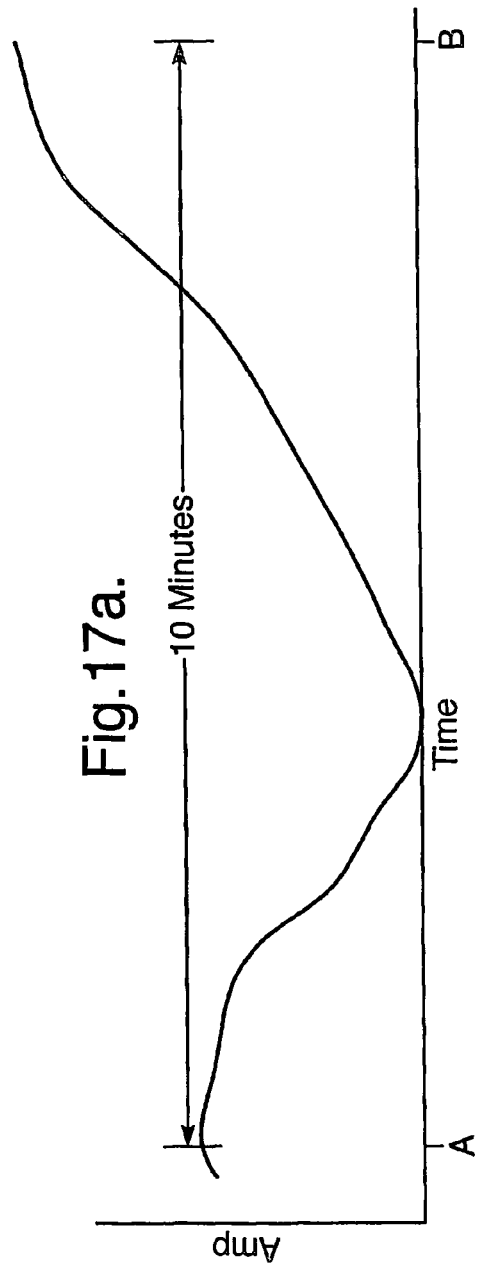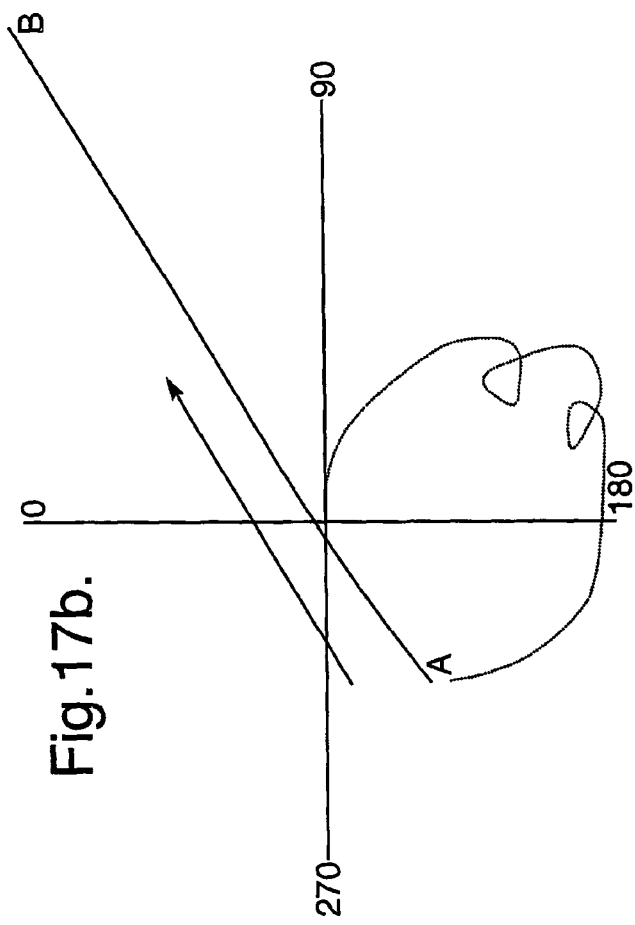

METHOD AND SYSTEM FOR ANALYSING TACHOMETER AND VIBRATION DATA FROM AN APPARATUS HAVING ONE OR MORE ROTARY COMPONENTS

FIELD OF THE INVENTION

This invention relates to a method and system for analysing tachometer and vibration data from an apparatus having one or more rotary components.

BACKGROUND

Apparatuses with rotary components, such as gas turbine engines, are subject to vibratory forces at frequencies which are related to the angular velocity of the respective component and hence engine speed. These frequencies are conventionally known as engine order forcing frequencies, each engine order corresponding to a rotational frequency of a particular component (or a fraction or harmonic of the fundamental frequency) and exerting a corresponding vibratory force on the engine.

The forces may arise because e.g. an engine is out of balance on a particular shaft, stiffness irregularities in engine components, and (significantly in the case of gas turbine engines) aerodynamic interactions between the blades of the engine.

At a given engine speed, a number of these engine orders are generally active and result in corresponding vibration responses in the engine which are measurable e.g. as strains or accelerations. Each vibration response generally has the same frequency as the engine order forcing frequency which generated it. However, the relative phase difference between a vibration response and the corresponding engine order may change as the engine speed varies, and particularly when the engine order traverses a resonance frequency of the engine.

Indeed, merely moving toward or away from such a resonance may cause the phase difference to change.

A conventional approach for determining the phase relationship between the forcing frequency of an engine component (e.g. a shaft) and a vibration response is to fit a dedicated once per revolution tachometer to the component. This tachometer would determine the component rotational position (i.e. phase) and also serves as a trigger for the collection of vibration measurements. The approach is illustrated by FIG. 1 which is a flow diagram showing the sequence of data acquisition and analysis events.

The approach is relatively simple in concept, and the synchronisation between the tachometer and the vibration measurements allows the absolute phase difference between the component rotational position and the vibration response to be determined. However, it relies on being able to fit an accurate, robust and dedicated tachometer to the component in question, something which is not always possible for complex components such as the shafts of multi-shaft gas turbine engines. Also the approach precludes deriving simultaneous phase information for other components (e.g. other shafts in a multi-shaft gas turbine), unless the investigator is able to fit further dedicated tachometers which in turn trigger further vibration measurements. Thus, in relation to gas turbine engines, the approach is only generally used for shaft balancing operations, where absolute phase information is needed.

However, U.S. Pat. No. 6,456,945 discloses a method which uses a measurement of absolute phase information to identify an anomaly, such as a crack, in a rotor. In this method, a vibration signal synchronous with the frequency of vibration is filtered from a vibration measurement. A background vibration vector is then subtracted from the vibration signal to produce a vibration difference signal. The phase and amplitude of the vibration difference signal are measured and evaluated to determine whether an anomaly has developed. However, the method is reliant on the rotor turning at a single, fixed trigger speed, and a disadvantage of the method is that a suitable trigger speed has to be known in advance.

SUMMARY OF THE INVENTION

The present invention is partly based on the realisation that a relative (rather than an absolute) phase difference between a forcing frequency and a vibration response can provide useful information about the state of an engine. In certain aspects, it is also partly based on the realisation that useful information can be obtained by analysing how forcing frequency and a vibration response data react to variation in rotational speed.

In general terms the invention provides a method and computer systems for analysing tachometer and vibration response data from an apparatus having one or more rotary components, the method comprising the steps of:
providing vibration response data and tachometer data from the apparatus, the tachometer data being for a rotary component of the apparatus;
determining a forcing frequency of the component from the tachometer data and a corresponding vibration response frequency of the apparatus from the vibration response data; and
comparing the forcing and vibration response frequencies to determine the relative phase difference between the frequencies. The phase difference may be used to diagnose the state of the apparatus or to identify an event occurring to the apparatus.

Preferably the amplitude of the vibration response is also determined from the vibration response data. The phase difference $\theta$ between the frequencies and the vibration amplitude a may then be plotted on a polar diagram, i.e. as the components of a vector $r = r(a, \theta) = (a \cos \theta)i + (a \sin \theta)j$, where i and j are the unit vectors in the x and y directions, respectively.

Thus, in a first aspect, the present invention provides a method of analysing tachometer and vibration response data from an apparatus having one or more rotary components, the method comprising the steps of:
providing vibration response data and corresponding tachometer data from the apparatus for a period over which a rotary component of the apparatus varies in rotational speed, the tachometer data being for that component;
repeatedly performing at intervals throughout the period the sub-steps of:
  determining a forcing frequency of the component from the tachometer data and a corresponding vibration response frequency of the apparatus from the vibration response data,
  comparing the forcing and vibration response frequencies to determine the relative phase difference between the frequencies, and
  determining the corresponding amplitude of the vibration response from the vibration response data; and
plotting the relative phase differences and vibration amplitudes on a polar diagram, whereby the plot trajectory is characteristic of the behaviour of the apparatus over the period.

On the polar diagram, as the relative phase difference $\theta$ and corresponding amplitude a determined at each interval are the (a, θ) components of the vector r, the plot trajectory is then the locus of successive vectors for different speeds. Advantageously, because the trajectory effectively samples a range of speeds, it may not be necessary to know in advance which rotation speed (if any) produces a phase difference/amplitude vector which is particularly sensitive to changes in apparatus behaviour.

Conveniently, the polar diagram may be visually displayed in some way, e.g. by printing or displaying on a monitor.

In general, apparatuses such as gas turbine engines display characteristic behaviours in relative phase difference and/or vibration amplitude as e.g. the engine accelerates, decelerates or cruises. Departures from these behaviours can be indicative of "abnormal" engine behaviour. Polar diagrams allow such departures to be easily identified, as the form of the above-mentioned trajectory displayed on such a diagram can be particularly sensitive to changes in behaviour. Even if the polar diagram is not visually displayed, the relative phase differences and vibration amplitudes, obtained for the period in which the component varies in rotational speed and represented as the components of vectors r, may be used e.g. to trigger an alert when "abnormal" behaviour occurs.

The phase difference and vibration amplitude, may be used to diagnose the state of the apparatus or to identify an event occurring to the apparatus e.g. in order to understand apparatus behaviour, validate apparatus models, troubleshoot the apparatus, monitor the "health" of the apparatus, monitor for abnormal events etc. Thus, preferably, the method further comprises the step of comparing the plot trajectory with a reference trajectory for a period in which the apparatus experiences the same variation in rotational speed, e.g. in order to diagnose the state of the apparatus or to identify an event occurring to the apparatus. For example, the reference trajectory may describe the normal trajectory associated with a healthy apparatus.

Preferably the apparatus is a gas turbine engine. The rotary component may be a turbine drive shaft of the engine.

The tachometer data and vibration response data may be independently acquired of each other, by which we preferably mean that the tachometer is not used to trigger acquisition of the vibration response data. This means that, compared with the conventional approach discussed above, more flexible data gathering arrangements can be adopted. For example, if tachometer data is available for each of a plurality of shafts of a multi-shaft gas turbine engine, the corresponding vibration response frequencies can all be derived from the same source of vibration response data. This source may be e.g. a single vibration transducer.

Although the tachometer data can provide the absolute rotary position of the component, this is not essential and the tachometer data can provide merely the relative rotary position of the component instead. For example, the tachometer may measure rotary position using a multi-pole or other non-unique position indicator, or it may measure the rotary position of the output of a set of gears, which are in turn connected, at a known gearing ratio, to the component of interest. Thus the problem of fitting a dedicated tachometer to the component can be avoided. Particularly with respect to complicated machinery, such as gas turbine engines, this makes it much simpler to obtain relative phase information from a plurality of components, such as the different drive shafts of the engine.

In preferred embodiments, the forcing and vibration response frequencies are compared in the time domain in order to determine the relative phase difference between the frequencies.

When performing phase comparisons between signals in the frequency domain, a reasonable level of coherence must be achieved within the cross-transform. However, in the previously-mentioned conventional approach for determining the phase relationship between the forcing frequency of a rotary component and a vibration response in which a tachometer triggers the collection of vibration measurements, the tachometer signal typically takes the form of narrow pulses. These pulses do not generally contain sufficient energy to maintain adequate coherence. A possible solution would be to extend the duration of each pulse by increasing its mark-space ratio, but this is only practicable over certain speed ranges of the component. However, by performing the phase measurement in the time domain these difficulties are overcome. A further advantage is that relative phase differences can be measured on a number of independent components (e.g. shafts), together with component orders which can be fractional multiples of the reference component rotational speed or can be mechanically coupled e.g. via gear trains.

Conveniently, the method may be performed on previously measured data. Alternatively it may further comprise the preliminary step of:

measuring the vibration response of the apparatus and rotational speed of the component over the period to obtain the vibration response data and corresponding tachometer data.

Related aspects of the invention provide (a) a computer system operatively configured to perform the method of the first aspect, (b) computer readable media carrying computer code for performing the method of the first aspect, and (c) a computer program for performing the method of the first aspect.

Optional and/or preferred features of the first aspect of the invention may also be applied to the related aspects. Thus, for example, the above computer system may be a system for diagnosing the state of the apparatus or for identifying an event occurring to the apparatus.

In one embodiment, a computer system for analysing tachometer and vibration response data from an apparatus having one or more rotary components comprises:

data storage for storing vibration response data and tachometer data from the apparatus, the tachometer data being for a rotary component of the apparatus, and the vibration response data and tachometer data preferably being acquired independently of each other, and a processor for (a) determining a forcing frequency of the component from the tachometer data and a corresponding vibration response frequency of the apparatus from the vibration response data, and (b) comparing the forcing and vibration response frequencies to determine the relative phase difference between the frequencies.

More particularly, the data storage may be for storing vibration response data and corresponding tachometer data from the apparatus for a period over which a rotary component of the apparatus varies in rotational speed, the tachometer data being for that component. Also, the processor may be adapted such that at intervals throughout the period it repeatedly (a) determines a forcing frequency of the component from the tachometer data and a corresponding vibration response frequency of the apparatus from the vibration response data, (b) compares the forcing and vibration response frequencies to determine the relative phase difference between the frequencies, (c) determines the corresponding amplitude of the vibration response from the vibration response data, and (d) plotting the relative phase differences and vibration amplitudes (as a vector) on a polar diagram, whereby the plot trajectory (of the vector) is characteristic of the behaviour of the apparatus over the period. The computer system may have a display to display the plot trajectory.

The present inventors have also realised that polar diagrams which represent phase difference and vibration amplitude measurements can be used in novel ways to model engine behaviour and monitor for engine abnormalities.

Thus a second aspect of the invention provides a method of constructing a model of normal behaviour for an apparatus having at least one rotary component, the method comprising the steps of:

measuring, for a rotational speed of the component, (a) the phase difference between a forcing frequency for the component and a corresponding vibration response frequency of the apparatus, and (b) the vibration amplitude of the response frequency; and using the measured phase difference θ and corresponding vibration amplitude a to determine, for the rotational speed, a perimeter which sets the limit of normal behaviour for that speed, the perimeter being plotted on a polar diagram which represents phase differences and vibration amplitudes.

Thus, on the polar diagram the perimeter is plotted around the tip of the vector r(a, θ) for that speed.

Preferably the centre of the (typically circular) area on the polar diagram encompassed by the perimeter is the average position of successive vectors r constructed from phase difference and vibration amplitude measurements at the same rotational speed. The radius may scale with the amount of scatter between the positions of the successive vectors r constructed from phase difference and vibration amplitude measurements (the amount of scatter may be quantified as the standard deviation, σ, of the different positions of the successive vectors). In this way, the method allows a statistically-based model of normal behaviour to be determined in situations where only intermittent operation occurs at each rotational speed. For example, an aero gas turbine engine under normal service conditions does not usually undergo smooth acceleration and deceleration manoeuvres between 0% and 100% speed, but rather spends varying amounts of time at different speeds. However, by applying the method of this aspect of the invention to each of a plurality of speeds, which preferably together cover the full range of speeds, a model of normal in service behaviour across the full range can be gradually accumulated without the need for dedicated acceleration and deceleration manoeuvres. A model of this type can be particularly useful for identifying slowly evolving engine abnormalities.

Alternatively, the model may be continually updated during operation of the apparatus. The centre of the area on the polar diagram encompassed by the perimeter can then be the position of the current vector r constructed from phase difference and vibration amplitude measurements. A perimeter radius may then be set which scales with e.g. the amount of noise in the measurements. If the position of the next vector r constructed from phase difference and vibration amplitude measurements is outside the perimeter, an engine abnormality may be the cause. Of course intentional changes in speed may also cause the position of the next phase difference and vibration amplitude measurements to move, but when such changes occur the perimeter radius can be momentarily expanded to compensate. This type of model can be particularly useful for identifying relatively quickly occurring engine abnormalities.

Preferably the apparatus is a gas turbine engine. The rotary component may be a turbine drive shaft of the engine.

Preferably the method of the first aspect of the invention is used to supply the measurements of phase difference and vibration amplitude. However, this is not essential and, for example, vibration response data may be acquired under the control of a tachometer (e.g. according to FIG. 1) and then used in the measurement of the phase difference and vibration amplitude.

Related aspects of the present invention provide computer readable media carrying a model of normal behaviour constructed according to the second aspect, and the use of such a model for monitoring for abnormal behaviour in an apparatus having at least one rotary component.

By a "computer system" we mean the hardware, software and data storage devices used to perform the method of a previous aspect. For example, a computer system of the present invention may comprise a central processing unit (CPU), input means, output means and data storage. Desirably the computer system has a monitor to provide a visual output display e.g. for polar diagrams. The data storage may comprise RAM or other computer readable media.

By "computer readable media" we mean any medium or media which can be read and accessed directly by a computer or computer system. The media include, but are not limited to: magnetic storage media such as floppy discs, hard disc storage medium and magnetic tape; optical storage media such as optical discs or CD-ROM; electrical storage media such as RAM and ROM; and hybrids of these categories such as magnetic/optical storage media.

BRIEF DESCRIPTION OF THE DRAWINGS

The various aspects of the invention will be further described by way of example with reference to the accompanying drawings, in which:

FIG. 1 is a flow diagram showing the sequence of data acquisition and analysis events in a conventional approach for determining the phase relationship between a forcing frequency and a vibration response;

FIG. 2 shows a schematic longitudinal section of the coaxial shafts of a Rolls-Royce multi-shaft gas turbine engine;

FIGS. 8a and b show respectively corresponding tracked orders and polar diagram plots for real data collected from a decelerating Rolls-Royce Trent engine;

FIG. 9 shows four vibration amplitude plots obtained from respective tests on a spinning disc rig performed on 17, 19, 21 and 24 Mar. 2003;

FIGS. 10a-c respectively show polar diagrams plotting the average trajectories of the phase difference/amplitude vector for the spinning disc rig tests of 17, 21 and 24 Mar. 2004;

FIGS. 12*a* and *b* show respectively a vibration amplitude plot and the corresponding polar diagram for real data collected from a Rolls-Royce-Trent engine operating at steady state which experienced a blade detachment event;

FIG. 13*a* is a graph of rotational speed against time for a sequence of the 24 Mar. 2004 acceleration/deceleration tests of FIGS. 9 and 10, and FIG. 13*b* shows the corresponding output from a change detector;

FIGS. 15*a* and *b* show respectively a vibration amplitude plot and the corresponding polar diagram for real data collected from a Rolls-Royce Trent engine operating at steady state which experienced an actual bird strike;

FIGS. 17*a* and *b* show schematically an HP vibration amplitude plot and the corresponding polar diagram for a Rolls-Royce Trent gas turbine engine experiencing progressive bearing failure.

DESCRIPTION OF THE EMBODIMENTS

Figure 3:
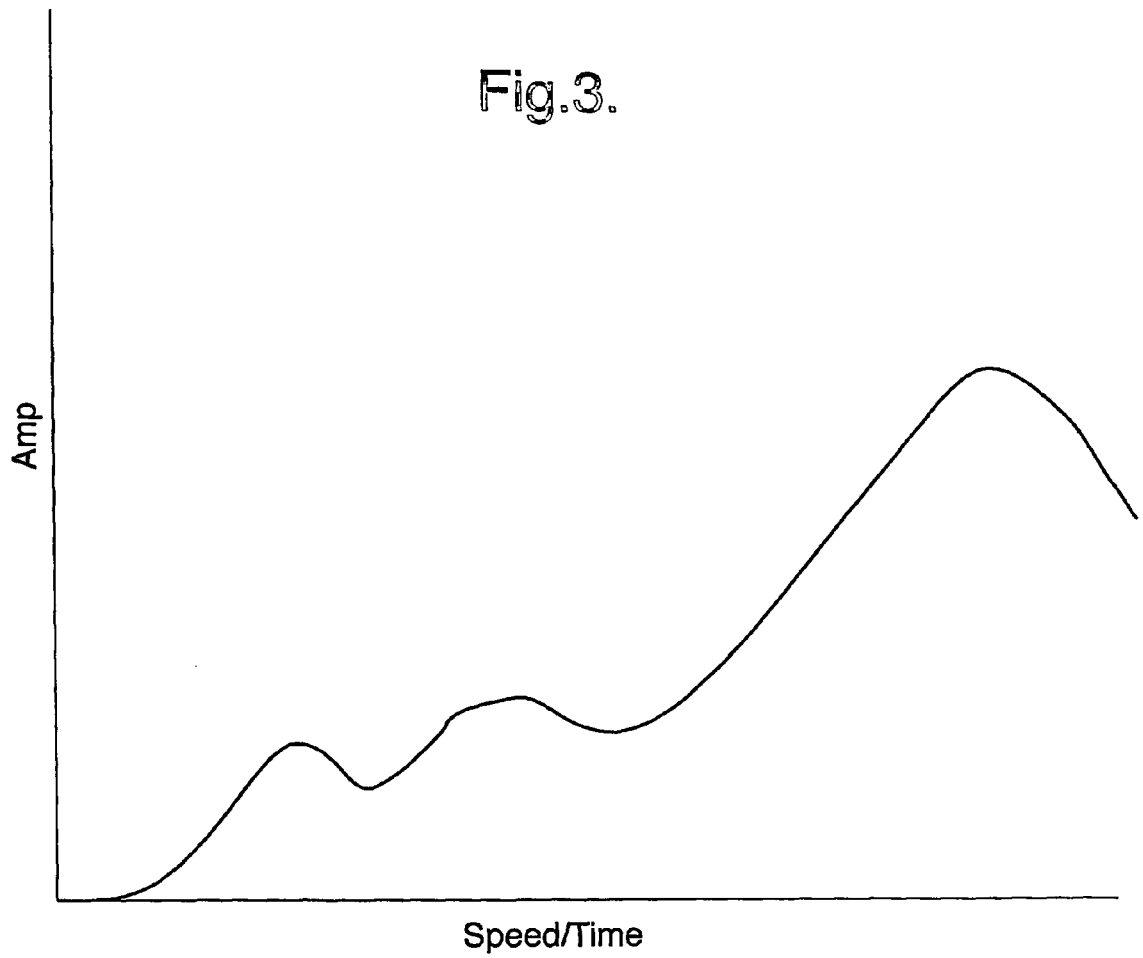
FIG. 3 shows schematically a vibration amplitude plot for a typical vibration response to an engine order forcing frequency during engine acceleration.

FIG. 2 shows a schematic longitudinal section of the three coaxial shafts of a Rolls-Royce multi-shaft gas turbine engine. Low pressure (LP) shaft 1 occupies the central position and is surrounded in turn by intermediate pressure (IP) shaft 2 and high pressure (HP) shaft 3.

LP shaft 1 carries a single pole tachometer 4 which is conventionally used for shaft balancing operations. IP shaft 2 carries a 60 pole tachometer 5 which is conventionally used for standard shaft speed measurements for engine control purposes. HP shaft 3 is connected via bevel gear 6 and step aside gearbox 7 to main (external) gear box 8, with a tachometer 9 connected to the output of the main gear box.

Tachometer 4 produces a signal pulse for each rotation of the LP shaft, and hence the rotational frequency (i.e. shaft speed) of the LP shaft can be determined from the inverse of the period between signal pulses. Tachometer 5 produces 60 signal pulses for each rotation of the IP shaft, and hence the rotational frequency of the IP shaft can be determined from the inverse of 60× the period between signal pulses. Tachometer 9 measures the rotational frequency of the output of the main gearbox. However, as the gearing ratios of the main and step aside gearboxes 7, 8 and bevel gear 6 are known, the rotational frequency of the HP shaft can be inferred from tachometer 9. The rotational frequencies measured by the tachometers provide the forcing frequencies (e.g. fundamental, fractional and harmonic components) for each shaft.

Tachometer 4 also provides an absolute measure of shaft rotational position, whereas tachometers 5 and 9 provide relative measures of shaft rotational position.

A vibration transducer (not shown in FIG. 2) is fitted to the engine and independently acquires vibration response data.

The vibration response data is sampled at an appropriate rate for the bandwidth of interest and is processed by an FFT in the conventional manner, retaining real and imaginary components. The phase derived for each real and imaginary pair is referenced to the phase angle of the first frequency bin in the transform window.

The vibration amplitude against time of a typical vibration response to an engine order forcing frequency (measured by tachometer 4, 5 or 9) during engine acceleration is shown schematically in FIG. 3. As the engine speed (and hence forcing frequency) increases, the amplitude of the corresponding vibration response varies. Such plots are herein termed "vibration amplitude plots"

Figure 4:
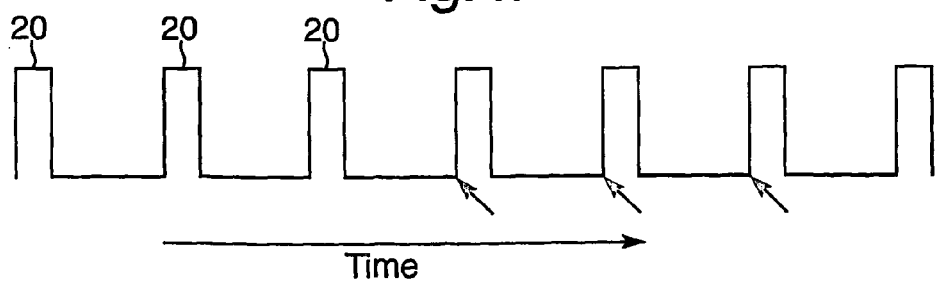
FIG. 4 shows-schematically the signals received from tachometer 5 of FIG. 2.

The tachometer signals are sampled at higher frequencies than the vibration response data. The shaft rotational frequencies (and hence fundamental forcing frequencies) are conveniently calculated by locating the positive rising transitions of the signal pulses. This is illustrated in FIG. 4, which shows schematically the signals received from tachometer 5. Each pulse 20 is caused by the passage of one of the 60 poles. Positive rising transitions are identified by arrows.

Figure 5:
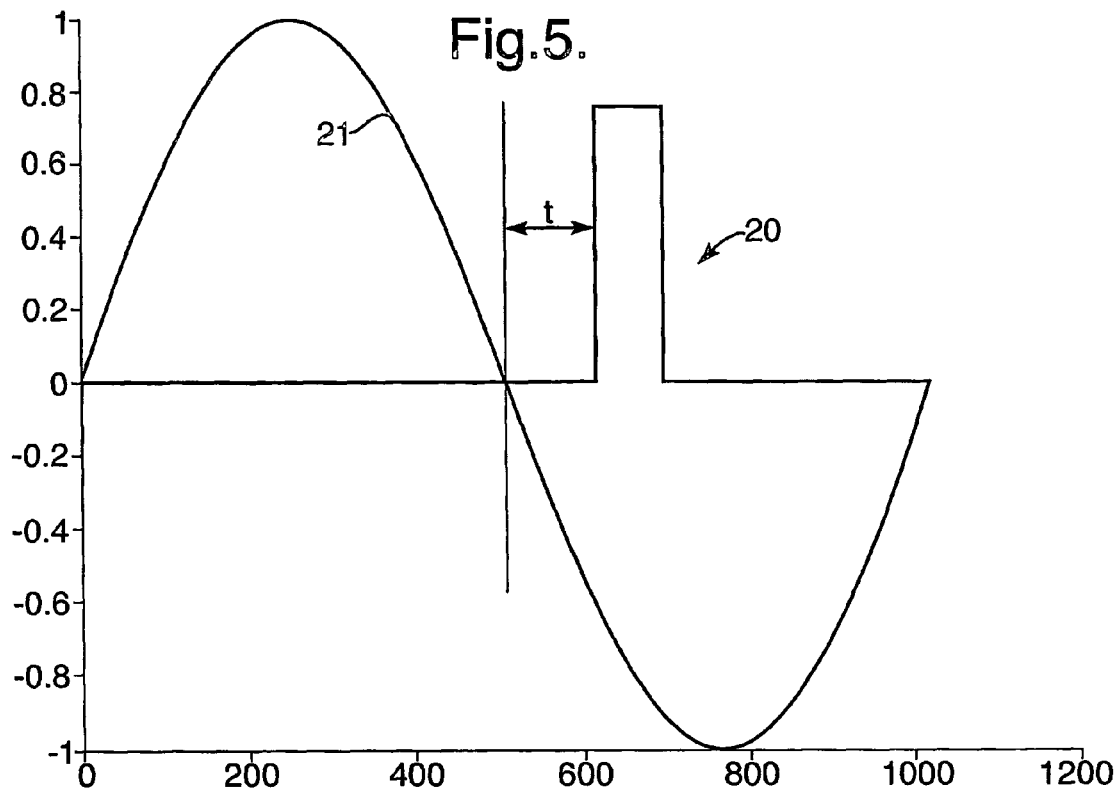
FIG. 5 is an example of a transform window.

Phase information from each tachometer signal is determined by locating the positive rising transition nearest to the centre of the transform window. The distance of this transition from the centre represents a time delay, t, between the transition of the tachometer signal and the response signal of the shaft. The phase of the shaft (and the respective fundamental forcing frequency) can be derived from the expression $2\pi ft$, where f is the rotational frequency of the shaft calculated previously. FIG. 5 is an example of a transform window showing the vibration signal for the first frequency bin 21, the tachometer signal 20, and time delay t. The window centre is indicated by the dotted vertical line.

In this way, each vibration response phase measurement is compared with the forcing frequency phase measurement for the same instant to derive a relative phase difference between the forcing frequency and the vibration response frequency. Essentially the forcing and vibration response frequencies are compared in the time domain. Fractional and harmonic frequencies and phases can be calculated from the fundamental forcing frequency and compared with the vibration response frequency in the same way. Relative phase differences can also be calculated for non-integral order related components (such as the radial drive shaft, gears, pumps etc.) which are directly or indirectly connected to the main shafts and have a fixed relationship of rotational speed to the monitored tachometer signal.

Figure 6:
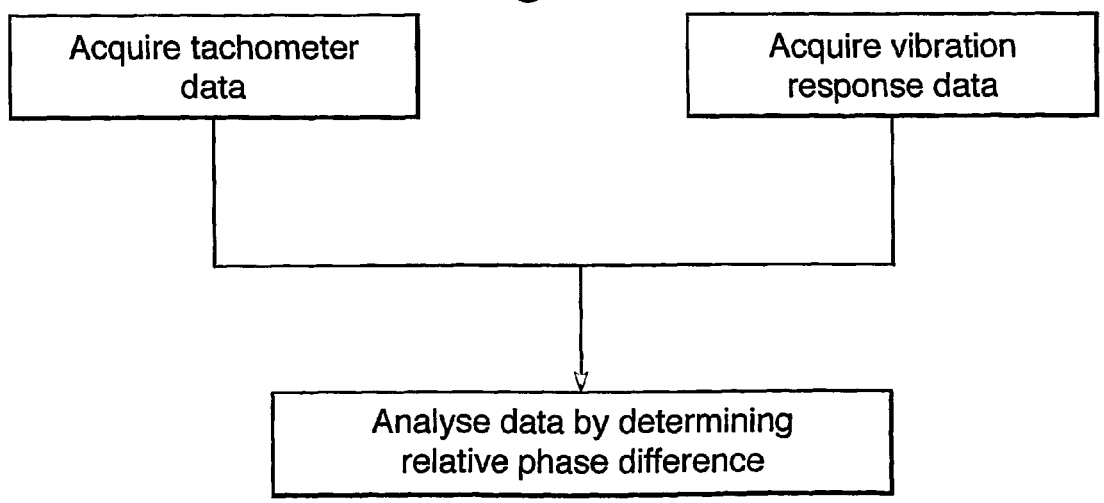
FIG. 6 is a flow diagram showing the sequence of data acquisition and analysis events in an approach for determining the phase relationship between an engine forcing frequency and a vibration response according to an embodiment of the present invention.

FIG. 6 is a flow diagram showing the sequence of data acquisition and analysis events according to this embodiment of the present invention. In contrast with FIG. 1, note how the data acquisition steps are independent of each other.

Figure 7A:
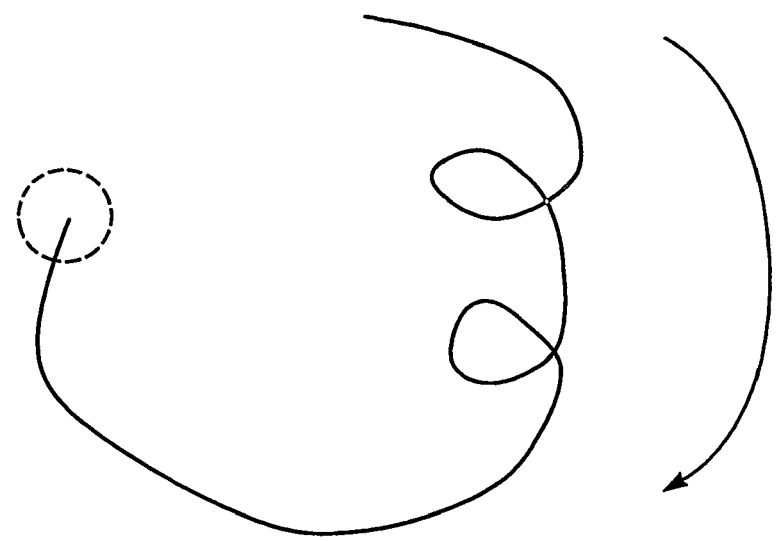
FIG. 7a shows schematically a polar diagram for the same engine acceleration as FIG. 3.

FIG. 7*a* shows schematically a polar or Nyquist diagram which plots the vibration amplitude of FIG. 3, and the relative phase difference between the vibration response of FIG. 3 and the engine order forcing frequency which produced the response. The vibration amplitude is represented as distance a from the origin and the phase difference as angular position θ. Thus each phase difference/amplitude pair forms the (a, θ) components of a vector r=r(a, θ), and the locus of all the vectors describes a path or trajectory on the diagram. The overall direction of increasing engine speed is indicated by the arrow. Such diagrams are herein termed "polar diagrams".

The plot follows a characteristic trajectory as the engine accelerates. In particular, the relative phase difference between the vibration response and the forcing frequency changes as the engine speed increases. These changes are primarily caused by the traversal through engine resonance frequencies. The overall looped shape of the trajectory is caused by engine resonances. The maxima in FIG. 3 can now be seen to be caused by the resonances. When the engine reaches its cruising speed the relative phase difference and vibration amplitude do not vary significantly, and the plot tends to remain within the relatively tightly demarcated area indicated by the dashed circle of FIG. 7a.

If the engine performs a series of successive acceleration/deceleration manoeuvres (each manoeuvre representing a period over which the rotational speeds of the engine shafts vary), trajectories having the same characteristic shape are formed on the polar diagram.

Figure 7B:
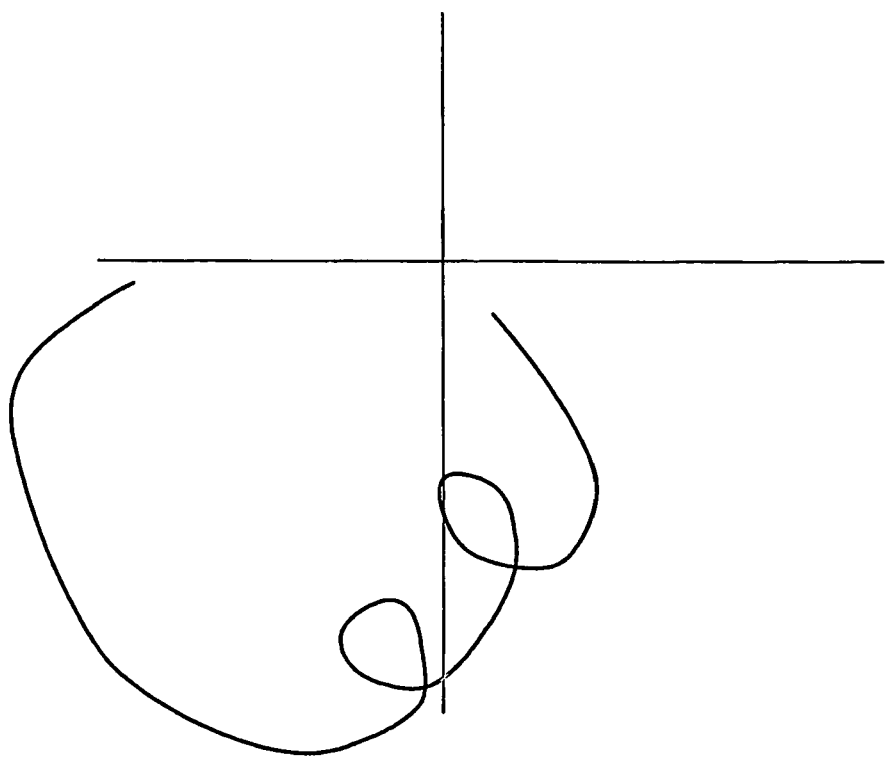
FIG. 7b shows schematically a further polar diagram for a different acceleration by the same engine.

However, in cases where the engine is shut down between manoeuvres, the measured relative phase difference between the vibration response and engine order forcing frequencies may be shifted. This shift manifests itself in the polar diagram as a rotation of the trajectory about the origin. FIG. 7b shows schematically a polar diagram for the same forcing frequency as FIG. 7a, but rotated in the manner described. When this happens, the measured relative phase differences may have to adjusted to account for phase shifts between the vibration response and engine order forcing frequency. This can be accomplished by using as a reference one or more speed sub-ranges (e.g. in the 50-70% range) which have well-characterised trajectories.

FIGS. 8a and b show respectively tracked order and polar diagram plots for real data collected from a decelerating Rolls-Royce Trent engine. The fundamental tracked orders and corresponding plots on the polar diagram are respectively labelled LP, IP and HP. Although the polar diagram plots are "noisier" than-the-schematic diagrams of FIG. 7, the characteristics features of the diagrams can be identified, particularly on the LP plot.

Such polar diagrams are particularly useful for providing indications of abnormal or unhealthy engine behaviour. In particular, a deviation from normal engine behaviour may manifest itself as a variation in relative phase difference and/or vibration amplitude, and this in turn can be readily identified by a departure from the characteristic trajectory of a polar diagram.

Trajectories may be compared using a Euclidean metric to measure the distances between each of the corresponding points on the trajectories (i.e. the vectors on each trajectory constructed from phase difference and amplitude measurements at the same rotational speed) and then summing these distances over the whole of the speed range. Speed sub-ranges (e.g. in the 50 to 70% range) which have well-characterised trajectories may be given a greater weighting in this metric.

FIG. 9 shows four vibration amplitude plots obtained from a spinning disc rig used to test and certify gas turbine engine rotary components. The rig was used to test a disc over a number of days, the plots shown being for the selected days of 17, 19, 21 and 24 Mar. 2003. The testing programme involved repeatedly accelerating the disc from idle to maximum speed, holding at maximum speed, and then decelerating back to idle, always with the same acceleration/deceleration profile. The amplitude of the disc vibration response (monitored using an accelerometer on the disc drive shaft) and the relative phase difference between the disc forcing frequency and vibration response were measured for each repetition of the test. The x-axis of the plots is disc spin speed, from idle to maximum speed, divided into 360 speed bins. At each speed bin, the vibration amplitude is the average measured over the acceleration and deceleration parts of each test. Furthermore, each plot is the average of approximately 1000 repetitions of the test performed on the given day. Occasionally the rig was inspected to ensure that it was in correct working order (if the rig or the component fails catastrophically during testing then significant damage to the rig can occur), but these inspections did not appear to affect the repeatability of the tests.

In the particular test of FIG. 9, the aim was to propagate a crack in the disc, and to detect the onset of failure.

Over all four days the vibration amplitude plots are highly consistent. The only significant difference is that on 24 March the second vibration amplitude peak at about speed bin 90 was higher than on previous days.

Figure 10B:
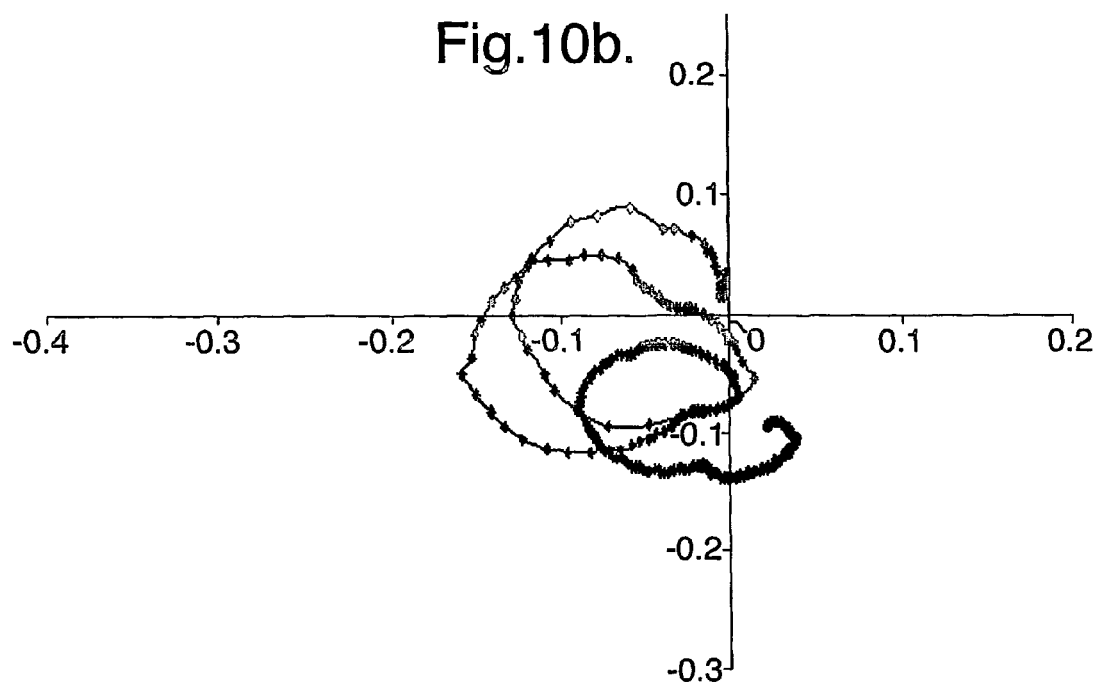
Figure 10C:
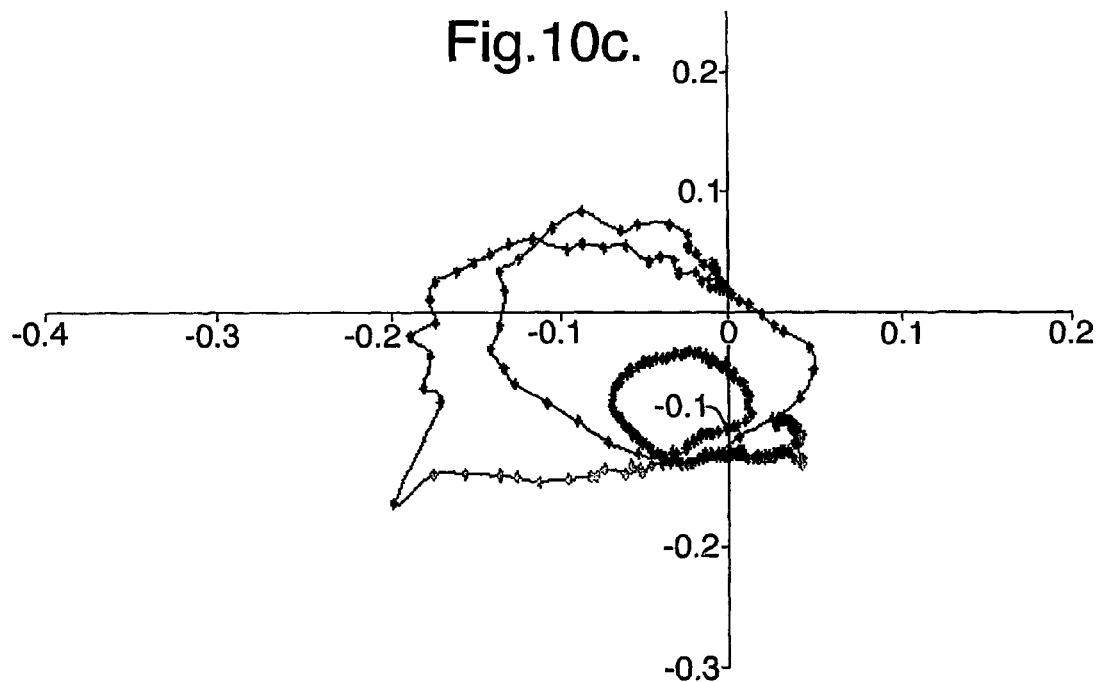

FIGS. 10a-c respectively show polar diagrams plotting the average trajectories of the phase difference/amplitude vector for the testing of 17, 21 and 24 March. Like the vibration amplitude plots, each trajectory combines the acceleration and deceleration parts of the tests. The 17 and 21 March trajectories are highly consistent, whereas the 24 March trajectory describes a markedly different locus. In fact, inspection on 24 March showed that a disc crack had started to propagate, which seemed to lead to the significant change in the rig response. To avoid catastrophic failure, the testing was halted at this point.

Overall, the testing programme demonstrated the usefulness of the vector trajectory representation for identifying departures from normal behaviour.

In retrospect, the departure from normal behaviour (i.e. the propagating crack) could also be identified from the speed bin 90 peak of the vibration amplitude plots. This suggests it might be sufficient to measure vibration amplitude and relative phase difference at a single, critical speed. However, in practical situations, and particularly in respect of complex machinery such as gas turbine engines, it is not often possible to know in advance what that critical speed will be. Also, the critical speed can vary depending on the type of departure from normality undergone by the component. For example, in the case of a gas turbine engine drive shaft, a bird strike to the engine might produce a significant displacement of the phase difference/amplitude vector at a different speed to, say, that at which the vector displacement caused by a slowly growing turbine blade surface crack is evident.

Figure 11A:
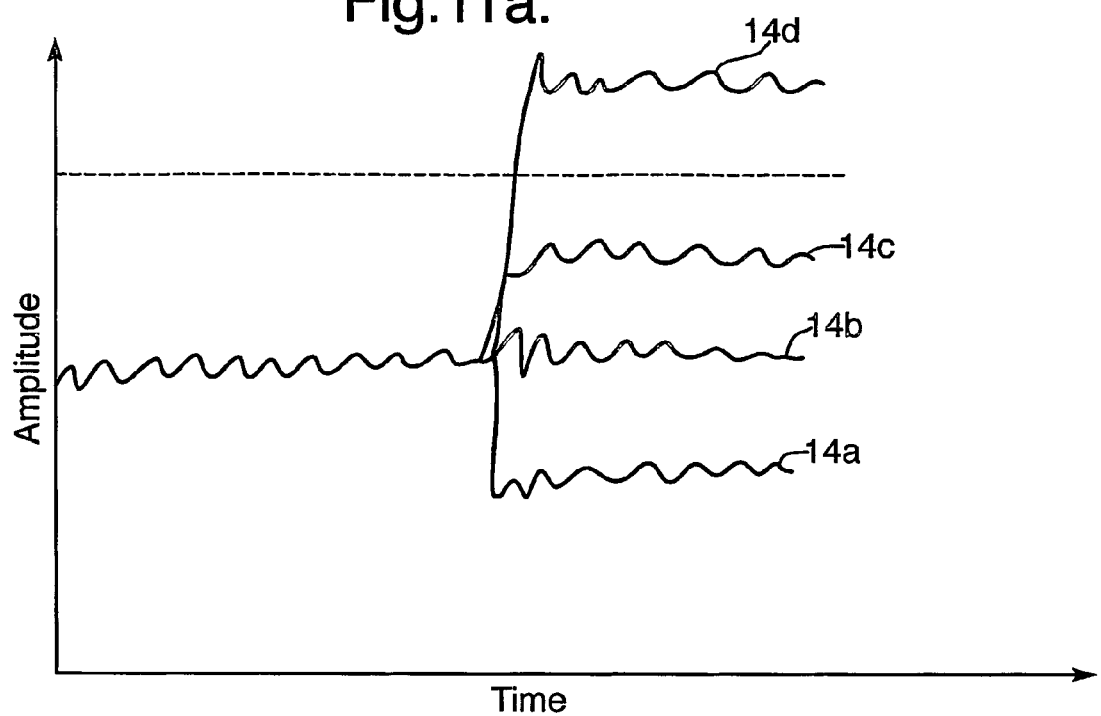
FIG. 11a shows four schematic plots, labelled 14a-d, of shaft vibration amplitude for respective "mass redistribution" events in a gas turbine engine.

FIG. 11a shows four schematic plots, labelled 14a-d, of shaft vibration amplitude for respective "mass redistribution" events (in this case a detached blade) in a gas turbine engine. Before and after the events the engine cruises at a constant speed. In a conventional detection system, an alert may be signalled if the vibration amplitude exceeds a threshold level, which in FIG. 11a is indicated by a dashed line. However, of the four possible scenarios shown in FIG. 11a, only one produces a significantly high increase in vibration amplitude to signal an alert, although potentially all the events are equally noteworthy.

Figure 11B:
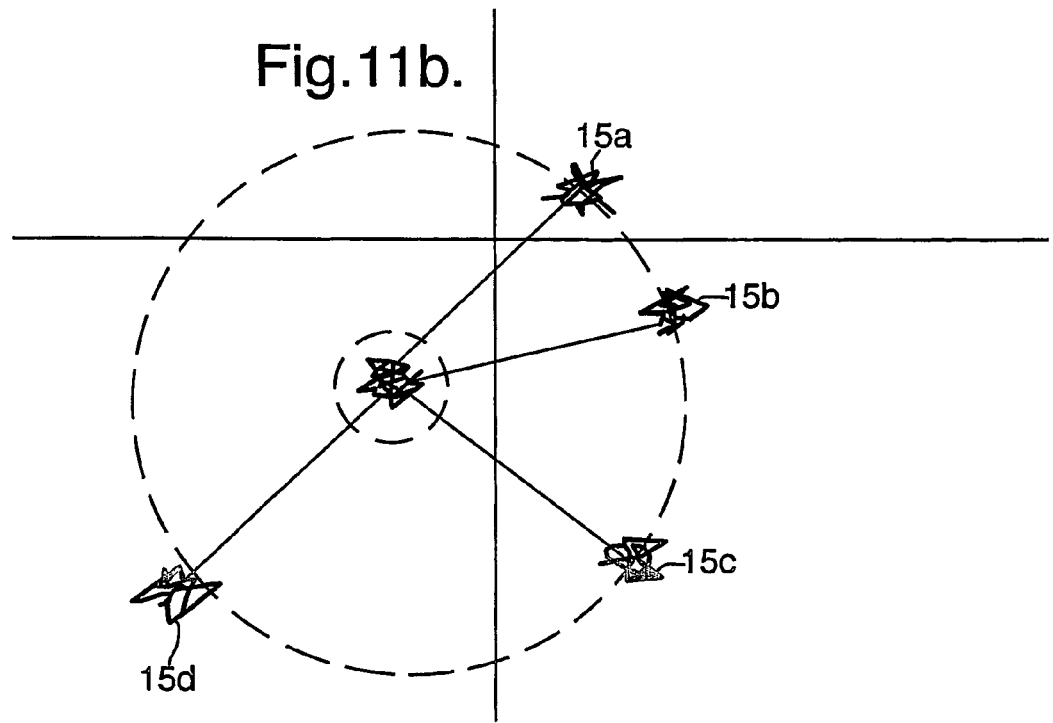
FIG. 11b shows four corresponding schematic polar diagram plots, labelled 15*a-d*, for the same events as FIG. 11*a*.

FIG. 11b shows four corresponding schematic polar diagram plots, labelled 15a-d, for the same events as FIG. 11a. Before the events all the plots are clustered within the smaller dashed circle in the same part of the diagram. After the events each plot relocates to a position on the larger dashed circle which represents possible outcome scenarios. Note how even events, such as that represented by plot 15b, which produce no change in vibration amplitude are easily identified on the polar diagram (the corresponding plot on FIG. 11a is 14b). Also events, such as that represented by plot 15a, which produce a reduction in vibration amplitude and so give the appearance of a more smoothly running engine (the corresponding plot on FIG. 11a is 14a), can be readily identified as engine abnormalities.

FIGS. 12a and b show respectively vibration amplitude and polar diagram plots for real data collected from a Rolls-Royce Trent engine operating at steady state which experienced an actual blade detachment event. The vibration amplitudes and corresponding relative phase difference are for the fundamental shaft tracked orders and are respectively labelled LP, IP and HP. In this case the blade detached from the HP shaft, which did in fact respond with a sharp increase in vibration. Note, however, how the LP and IP vibration amplitudes varied only slightly, whereas their relative phase differences shifted significantly.

Thus polar diagrams may be used to provide warning systems for engine malfunction or abnormal behaviour. Trajectories may be compared using a Euclidean metric, which may give a greater weight to certain speed sub-ranges. In contrast, the detection of step changes during what should be steady state operation may be implemented with the following pseudo code:

If engine is in steady state (e.g. <0.3% speed change in last 2 sec):
1) Record present position r on polar diagram
2) Update estimate for noise radius (i.e. error in present position) based on at least ten previous position measurements
3) Calculate step change score:

$$\text{score} = \frac{\Delta r}{\text{noise radius}} - (k \cdot \Delta s + C)$$

where $\Delta r$ is the distance on the polar diagram between the present and the previous position, $\Delta s$ is the change in speed, and $(k.\Delta s+C)$ is a linear relationship between shaft speed and change in phase plot position (k and C being empirically derived constants)
4) If the step change score exceeds a predetermined threshold, declare an abnormal behaviour.

The system continuously updates the estimated variation due to noise in the vibration response data. Effectively, the system draws a circle on the diagram within which the plot of vibration amplitude and relative phase difference can wander randomly at a given engine speed. This circle defines a perimeter outside of which abnormal behaviour is declared. Since vibration amplitude and relative phase difference are expected to vary as the engine speed changes, the allowed changes to the plot are scaled by the rate of change of speed. The overall effect is for the radius of the circle to increase during changes of speed.

Although the pseudo code was developed as a steady state step change detector, it can also be used when the rotational speed of the component is varying in a repetitive manner, i.e. for repeated acceleration/deceleration tests. In this case, respective values for k and C may be provided for each speed or speed sub-range, and the noise radius at each speed can be based on the position measurements (i.e. vector positions) at previous repetitions.

In fact, such a detector was applied during the testing described above in relation to FIGS. 9 and 10. FIG. 13a is a graph of rotational speed against time for a sequence of the acceleration/deceleration tests of 24 Mar. 2004. FIG. 13b shows the corresponding output from the change detector. The peaks are instants when the detector detected significant departures from normality. The heights of the peaks correspond to the magnitudes of the departures.

Figure 14A:
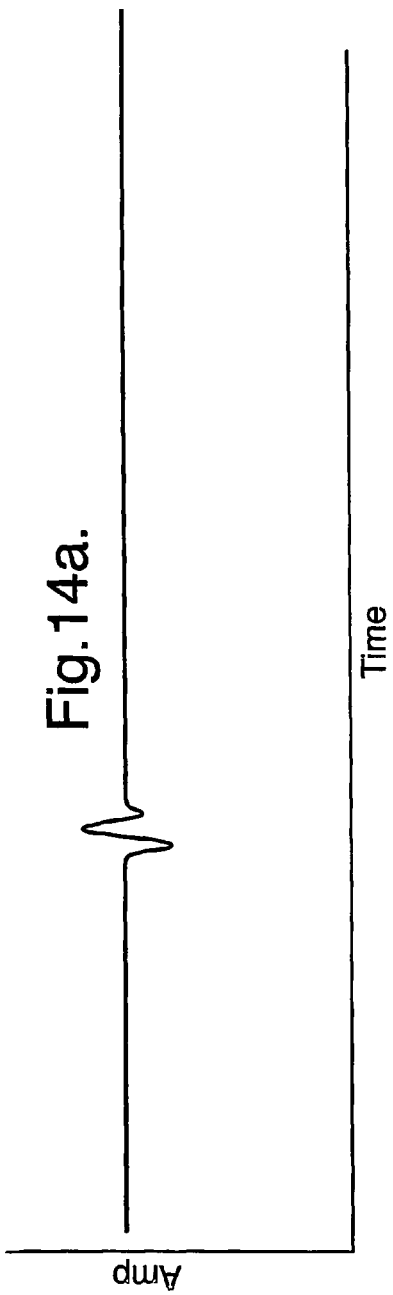
FIGS. 14*a* and *b* show respectively a schematic LP vibration amplitude plot and the corresponding polar diagram for a gas turbine engine experiencing a bird strike.
Figure 14B:
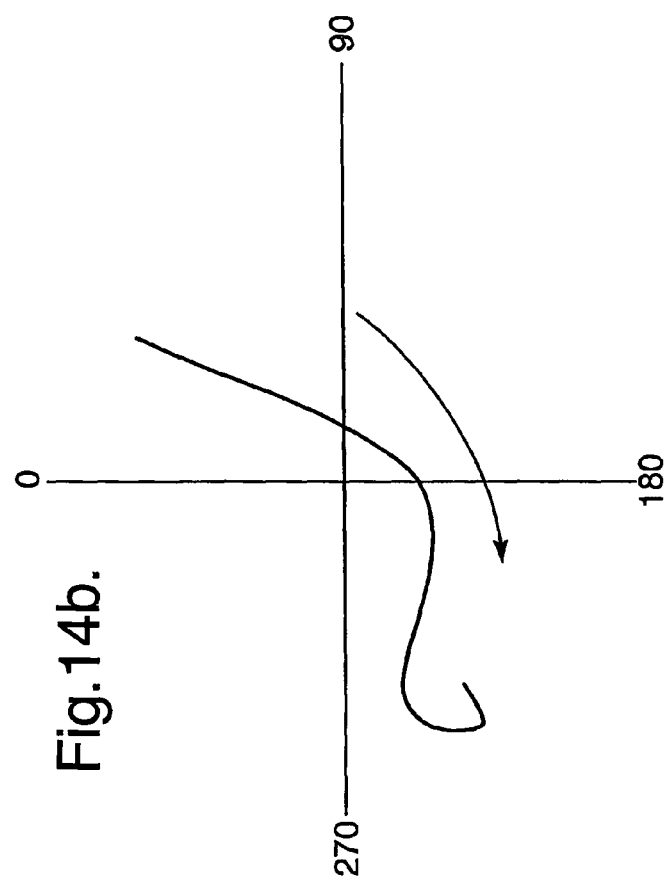

A further example of an event that could be detected by such a system is a step change caused by foreign object damage. FIGS. 14a and b respectively show a schematic LP vibration amplitude plot and the corresponding polar diagram for a foreign object damage event (in this case a bird strike) to a gas turbine engine. The bird strike produces only a small temporary deviation (of about 0.5 s duration) on the vibration amplitude plot, which could easily be overlooked or missed altogether. On the polar diagram, however, the bird strike provokes a readily detectable and significant change in relative phase difference.

FIGS. 15a and b show respectively vibration amplitude and polar diagram plots for real data collected from a Rolls-Royce Trent engine operating at steady state which experienced an actual bird strike. As before, the vibration amplitudes and corresponding relative phase difference are for the fundamental shaft tracked orders and are respectively labelled LP, IP and HP. As might be expected, the vibration amplitude for the LP shaft increased sharply. Note, however, how the IP shaft vibration amplitude actually decreased after the strike, and the HP shaft vibration amplitude behaviour was largely unchanged. In contrast, the relative phase differences for the three shafts were all disturbed by the bird strike, as shown by the polar diagram.

The examples of FIGS. 9 to 15 show how the relative phase difference between forcing and vibration response frequencies, and its representation on a polar diagram, can be used to detect events which lead to step changes during steady state operation or repetitive speed variations. A similar approach is also useful, however, for detecting and monitoring more slowly evolving engine abnormalities.

As a first step an appropriate model of normality against which slowly evolving engine changes can be tracked is established. In service, aero engines do not usually experience the acceleration/deceleration manoeuvres which produced the polar diagram plots shown in previous Figures. Instead they spend differing amounts of times at different engine speeds. Thus, for example, if maximum engine speed is designated 100%, most engines spend much of their operational time in the 70-95% speed range.

In order to build up the normal model, the entire speed range is divided into a smaller (e.g. 1%) sub-ranges. Each time the engine passes through a sub-range, the relative phase difference and vibration amplitude are recorded. As more data is acquired over further flights an average position (determined by the phase difference and vibration amplitude) on the polar diagram and a standard deviation from that position is associated with each sub-range. Typically, it may require e.g. 100 flying hours or 25 flight cycles to provide enough data to accurately characterise the entire speed range in this way. As the engine may be shut down between flights, the measured relative phase differences may have to adjusted to account for phase shifts between the vibration response and engine order forcing frequency. This can be accomplished by using one or more well-characterised speed sub-ranges (e.g. in the 50-70% range) as a reference.

Figure 16A:
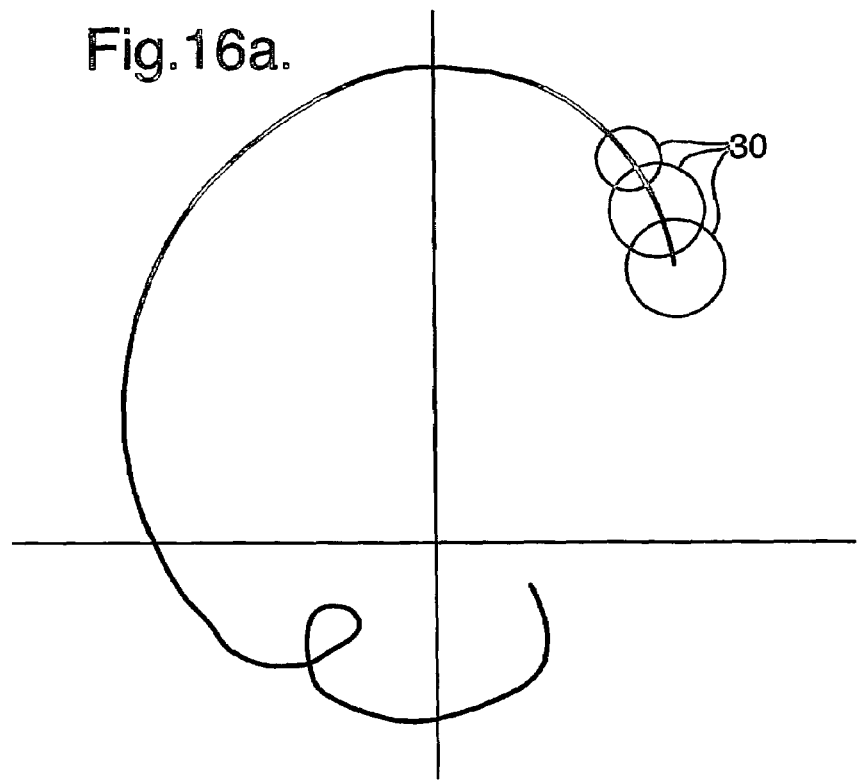
FIG. 16*a* shows a polar diagram plot for a typical acceleration-deceleration manoeuvre superimposed with three circles corresponding to average position and 3σ limits for respective speed sub-ranges determined from 100 flying hours of data.

FIG. 16a shows a polar diagram plot for a typical acceleration-deceleration manoeuvre. Superimposed on the plot are three circles 30. The centre of each circle is the average measured position for a particular speed sub-range determined from 100 flying hours of data. The radius of each circle is the (3× the standard deviation) value for the measured position data. Each circle, therefore, has a radius setting the limit of normal behaviour for respective speed sub-range.

Figure 16B:
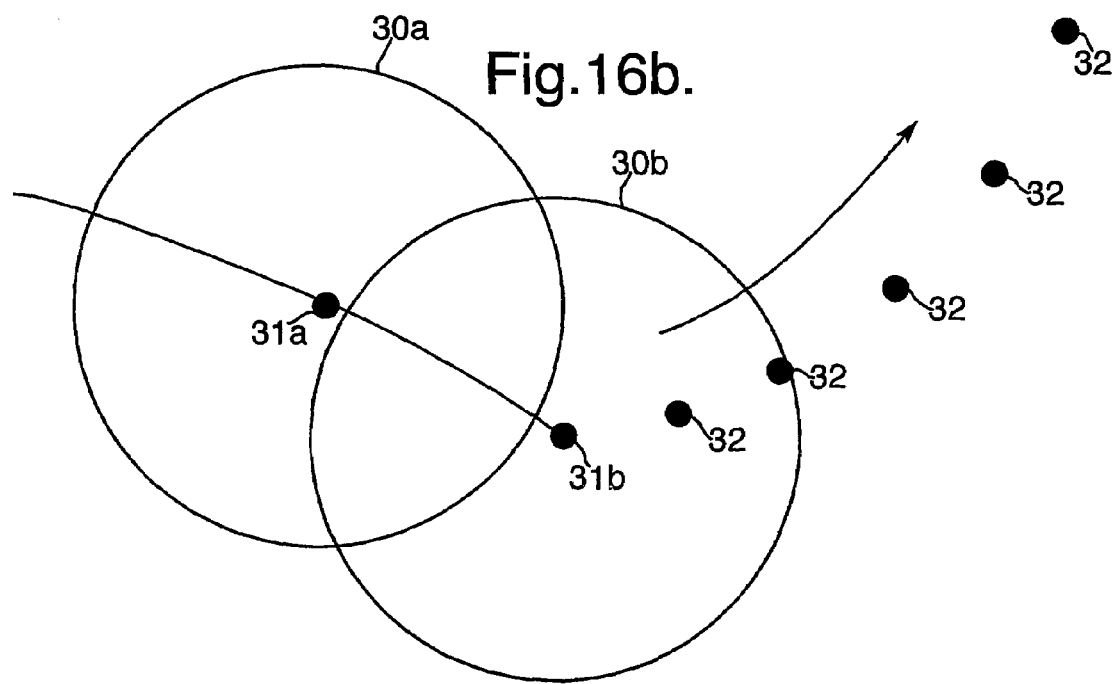
FIG. 16*b* is a detail of the high speed end of the plot of FIG. 16*a*.

FIG. 16b is a detail of the high speed end of the plot of FIG. 16a. The average positions for the speed sub-ranges centred on 97% and 98% speed respectively are indicated by dots 31a and 31b and the corresponding 3σ circles 30a and 30b are also shown. The progression of dots 32 are real-time average positions for 98% speed, the arrow indicating the time order in which the average positions were measured. The observed evolution of 98% speed average position is characteristic of a progressive failure mode. This failure is flagged when the 98% speed average position oversteps the 3σ boundary.

The following examples illustrate the detection of progressive failure modes using this approach. FIG. 17a shows schematically an HP vibration amplitude plot for a Rolls-Royce Trent gas turbine engine. At time A the engine has just reached cruising speed. There follows an approximately four minute period in which the HP vibration amplitude decreases to almost zero. A superficial interpretation of this decrease might be that the engine is running more smoothly. However, in the six subsequent minutes, the vibration amplitude increases until at time B an HP location bearing failure occurs. In retrospect, therefore, it is clear that the decrease and increase in vibration amplitude was actually caused by a progressive bearing failure.

FIG. 17b shows the corresponding HP polar diagram. Up to time A, the path of the polar diagram follows that of the normal model. Then, rather than remaining approximately stationary when cruising speed is attained, the path veers off in a straight line. Thus from the polar diagram the departure from normality is apparent as soon as the 3σ limit for cruising speed is overstepped (i.e. almost immediately), allowing the engine operator to take remedial action at an earlier stage. Note that the point of closest approach of the straight line to the origin corresponds to the minimum in the HP vibration amplitude shown in FIG. 17a.

Figure 18A:
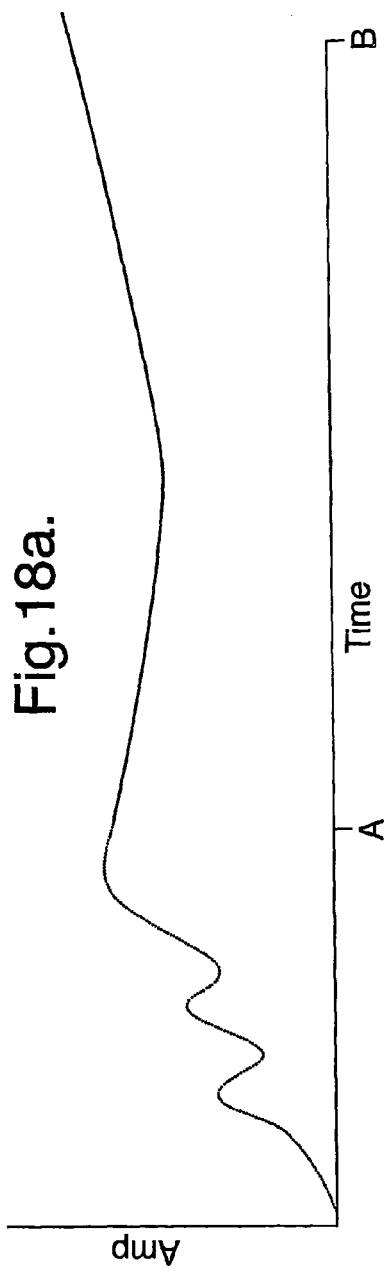
FIGS. 18*a* and *b* show schematically a vibration amplitude plot and the corresponding polar diagram for a shaft of an accelerating and subsequently cruising gas turbine engine, one of the shaft fan blades having a growing skin crack.
Figure 18B:
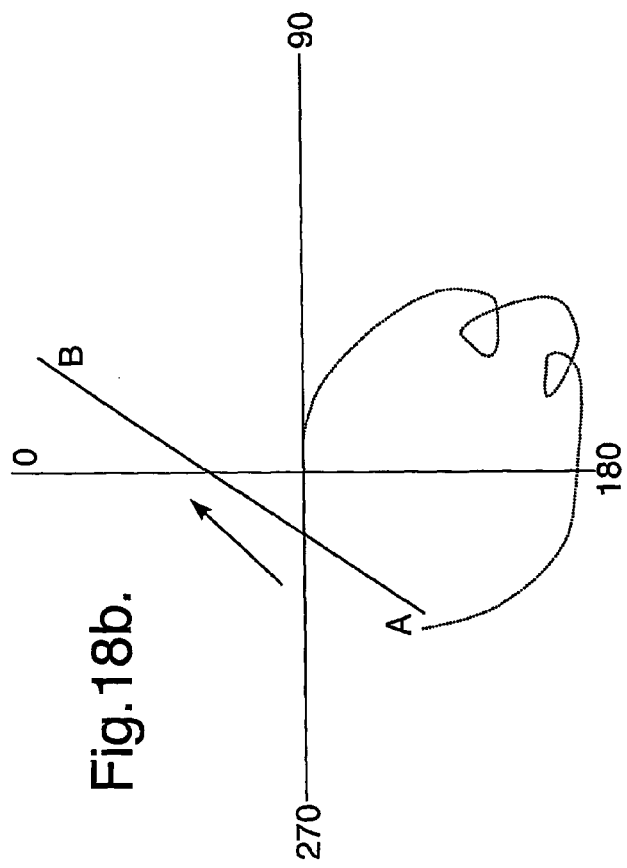

FIGS. 18a and b again show schematically a vibration amplitude plot and the corresponding polar diagram for an accelerating and subsequently cruising gas turbine engine. In this case a fan blade having a relatively well-developed skin crack was planted in the engine. The crack did not grow significantly during engine acceleration, and the vibration amplitude plot and polar diagram followed their normal paths as the engine accelerated to cruising speed at time A. However, over a period at cruising speed the crack grew until the blade failed. As there was little variation in the amplitude of the vibration response during this period, the vibration amplitude plot gave little warning of the incipient failure. In contrast, the growing crack produced a significant change in relative phase difference which was immediately identifiable from the polar diagram.

Other gas turbine engine problems which can be identified from variations relative phase difference behaviour and/or polar diagrams include unbalance, squeeze film bearing problems, rubs, joint movements, oil in drum, ½ speed whirl, instability and blade scatter. Indeed, in certain cases it may be possible to diagnose the cause of the problem from the form of the polar diagram. For example, a typical response to rub is an increase in response vibration amplitude at constant relative phase difference.

The invention claimed is:

1. A method of analysing tachometer and vibration response data from an apparatus having one or more rotary components, the method comprising the steps of:
    providing vibration response data and corresponding tachometer data from the apparatus for a period over which a rotary component of the apparatus varies in rotational speed, the tachometer data being for that component;
    repeatedly performing at intervals throughout the period the sub-steps of:
        determining a forcing frequency of the component from the tachometer data and a corresponding vibration response frequency of the apparatus from the vibration response data,
        comparing the forcing and vibration response frequencies to determine the relative phase difference between the frequencies, and
        determining the corresponding amplitude of the vibration response from the vibration response data;
    plotting the relative phase differences and vibration amplitudes on a polar diagram, whereby the plot trajectory is characteristic of the behaviour of the apparatus over the period; and
    comparing the plot trajectory with a reference trajectory for a period in which the apparatus experiences the same variation in rotational speed.

2. A method according to claim 1, wherein the vibration response data and tachometer data are acquired independently of each other.

3. A method according to claim 1, wherein the apparatus is a gas turbine engine.

4. A method according to claim 3, wherein the rotary component is a turbine drive shaft of the engine.

5. A method according to claim 1, wherein the tachometer data does not provide the absolute rotary position of the component.

6. A method according to claim 1, wherein the forcing and vibration response frequencies are compared in the time domain in order to determine the relative phase difference between the frequencies.

7. A computer system operatively configured to perform the method of claim 1.

8. Computer readable media carrying computer code for performing the method of claim 1.

9. A computer implemented method for performing the method of claim 1.

* * * * *

UNITED STATES PATENT AND TRADEMARK OFFICE
CERTIFICATE OF CORRECTION

PATENT NO. : 7,640,802 B2  Page 1 of 1
APPLICATION NO. : 10/552745
DATED : January 5, 2010
INVENTOR(S) : King et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 607 days.

Signed and Sealed this

Sixteenth Day of November, 2010

David J. Kappos
*Director of the United States Patent and Trademark Office*